(12) United States Patent
Scalzo

(10) Patent No.: US 8,307,792 B2
(45) Date of Patent: Nov. 13, 2012

(54) MECHANISM FOR INTERNAL COMBUSTION PISTON ENGINES

(75) Inventor: Joseph Scalzo, Kew (AU)

(73) Assignee: Scalzo Automotive Research Pty Ltd, Victoria (AU)

( * ) Notice: Subject to any disclaimer, the term of this patent is extended or adjusted under 35 U.S.C. 154(b) by 366 days.

(21) Appl. No.: 12/668,302

(22) PCT Filed: Jul. 8, 2008

(86) PCT No.: PCT/AU2008/000999
§ 371 (c)(1),
(2), (4) Date: Jan. 13, 2010

(87) PCT Pub. No.: WO2009/006682
PCT Pub. Date: Jan. 15, 2009

(65) Prior Publication Data
US 2010/0180868 A1    Jul. 22, 2010

(30) Foreign Application Priority Data

Jul. 9, 2007    (AU) ................................ 2007903683

(51) Int. Cl.
*F02B 75/04* (2006.01)
(52) U.S. Cl. ..................................... 123/48 B; 123/48 R
(58) Field of Classification Search ............... 123/48 B, 123/48 R, 78 A, 78 BA, 78 E, 3
See application file for complete search history.

(56) References Cited

U.S. PATENT DOCUMENTS

| | | | |
|---|---|---|---|
| 4,270,495 A * | 6/1981 | Freudenstein et al. ....... | 123/53.1 |
| 5,136,987 A * | 8/1992 | Schechter et al. .......... | 123/48 B |
| 6,227,161 B1 * | 5/2001 | Urushiyama .............. | 123/197.4 |
| 6,390,035 B2 * | 5/2002 | Moteki et al. ............ | 123/78 BA |
| 6,877,463 B2 * | 4/2005 | Moteki et al. ............ | 123/48 B |
| 7,174,863 B2 * | 2/2007 | Scalzo ................... | 123/48 B |
| 7,219,647 B1 | 5/2007 | Brickley | |
| 7,373,915 B1 * | 5/2008 | Joniec ................... | 123/197.1 |
| 2003/0209213 A1 * | 11/2003 | Moteki et al. ............ | 123/48 B |
| 2006/0048728 A1 * | 3/2006 | Scalzo ................... | 123/53.1 |

FOREIGN PATENT DOCUMENTS

| | | |
|---|---|---|
| DE | 3038345 A1 | 5/1982 |
| DE | 102005026119 A1 | 12/2006 |

OTHER PUBLICATIONS

English Language Abstract for DE102005026119 taken from esp@cenet.com.
English Language Abstract for DE3038345 taken from esp@cenet.com.

* cited by examiner

*Primary Examiner* — Noah Kamen
*Assistant Examiner* — Long T Tran
(74) *Attorney, Agent, or Firm* — Norris McLaughlin & Marcus PA

(57) ABSTRACT

An internal combustion engine has a mechanism, through which movement of a piston can be transferred to a crankshaft, from a first con rod on which the piston is mounted. The mechanism has an oscillating device mounted on a crankcase of the engine for oscillating on a first axis parallel to the crankshaft axis. The oscillating device is connected to a second con rod connected to the crankshaft for relative rotation on a second axis parallel to the first axis, and also to the first con rod for rotation on a third axis parallel to the first and second axes. The oscillating device is connected to the con rods so that the first axis and the crankshaft axis are on opposite sides of the piston axis, to enable adjustment of piston reciprocation.

18 Claims, 15 Drawing Sheets

MECHANISM FOR INTERNAL COMBUSTION PISTON ENGINES

This is an application filed under 35 USC 371 of PCT/AU2008/000999.

FIELD OF THE INVENTION

This invention relates to a rocking mechanism for a piston of an internal combustion (IC) engine. The invention also relates to an IC engine in which the motion of the piston of at least one of a plurality of cylinders is transferable by a said rocking mechanism to a crankshaft.

BACKGROUND TO THE INVENTION

Conventional IC piston engines are made in a variety of cylinder configurations. For automotive engines, these include in-line, horizontally opposed and V-type configuration. Particularly with each automotive engine configurations, the engine is sized in volumetric capacity to enable desired maximum speed and acceleration requirements. However the engine size generally means that at low load conditions, and during deceleration and braking periods, which together form a major part of the operating time for the engine, fuel consumption is high because the engine needs to be throttled and operates at a much reduced overall efficiency.

Many attempts have been made to reduce the capacity of IC engines during low load conditions by one or both of variable stroke mechanisms and cutting off fuel to some of the cylinders. However, most of these attempts have not been successful or effective. In the case of shutting off fuel to some of the cylinders, there has been some improvements but, because the piston of each of the cylinders to which fuel is shut off is still moving and therefore contributing to overall friction levels, maximum benefits have not been derived.

In our International patent application WO2004/061270 and corresponding U.S. Pat. No. 7,174,863, there is disclosed a mechanism for internal combustion engines, and engines having the mechanism, which enables the stroke of at least one piston to be varied between extremes. In some instances, the stroke is able to be reduced to zero. Thus, when the stroke is reduced to zero and the fuel supply is shut off, the piston concerned is immobilised and hence it does not contribute to overall friction levels. However, the mechanism of WO2004/061270 and U.S. Pat. No. 7,174,863 is limited in the range of engine configurations in which it can be used. Also, engine configurations in which the mechanism is able to be used occupy a relatively large volume.

The present invention is directed to providing a rocking mechanism for an IC engine which, in an engine in which it is provided, is able to be adapted for at least one of variation in piston stroke, piston de-activation and variation in compression ratio. Relative to the mechanism of WO2004/061270 and U.S. Pat. No. 7,174,863, the present invention seeks to provide a mechanism suitable for a wide range of engine configurations and which enables a more compact engine form.

SUMMARY OF THE INVENTION

According to a first aspect of the present invention, there is provided a rocking mechanism through which linear reciprocating movement of a piston in a cylinder of an internal combustion engine can be transferred, from the remote end of a con rod on which the piston is mounted to a crankshaft, the rocking mechanism including:
an oscillating device;
a mounting device by which the oscillating device is mountable on a structure of, or secured to, a crankcase of the engine for reversible oscillating movement of the oscillating device on a first axis parallel to the crankshaft axis;
wherein the oscillating device is adapted for pivotally connecting to each of:
(i) the little end of a further con rod having a big end connectable to the crankshaft for relative rotation, between the rocking mechanism and the further con rod, on a second axis spaced from and parallel to the first axis, and
(ii) the remote end of the con rod on which the piston is mounted for relative rotation, between the rocking mechanism and said remote end, on a third axis spaced from and parallel to each of the first and second axes; and
wherein the first and third axes are substantially equidistant from the second axis and the oscillating device is pivotally connectable to the respective con rods so that the first axis and the crankshaft axis are positioned to opposite sides of an axis on which the piston is reversibly reciprocable.

The oscillating device may be a rigid, unitary oscillating member which is adapted at respective locations for direct pivotally connection to the little end of the further con rod and the remote end of the con rod on which the piston is mounted. Preferably the oscillating device is an oscillating member which has a pair of rigid, laterally spaced portions to each of which the little end of the further con rod and the remote end of the con rod on which the piston is mounted is directly pivotally connectable at a respective location.

In one arrangement, the oscillating device includes an oscillating member by which the oscillating device is mountable on said structure of, or secured to, the crankcase, and further includes a link member and a holding and adjusting device. At one of opposite ends, the link member is pivotally connected to the oscillating member so as to be pivotable relative to the oscillating member on a fourth axis, co-incident with or adjacent to the second axis, between two extreme positions. At the other end the link member is adapted for pivotally connecting on the third axis to the remote end of the con rod on which the piston is mounted. In that arrangement the holding device is operable to releasably hold the link member at either of two extreme positions and to adjust the link member by causing movement of the link member between the two extreme positions.

In that arrangement, the oscillating member may be a rigid unitary oscillating member to which the little end of the further con rod and the one end of the link member is pivotally connected for pivoting relative to the oscillating member on the second and fourth axis, respectively. However, it is preferred that the oscillating member has a pair of rigid, laterally spaced portions to each of which the little end of the further con rod and the one end of the link member is pivotally connected for pivoting relative to the oscillating member on the second and fourth axis, respectively.

Also, in that arrangement, the oscillating device may include a laterally spaced pair of link members each pivotally connected at one end thereof to the oscillating member and each adapted at the other end thereof for pivotally connecting on the third axis to the remote end of the con rod on which the piston is mounted.

The mounting device may comprise a shaft having a longitudinal axis parallel to but spaced from the first axis, the shaft having an eccentric providing a crank journal on which the oscillating device is mounted for reversible oscillating movement on the first axis. The shaft may be adapted to be mounted on the structure of, or secured to, the crankcase and to receive drive by which it is reversibly rotatable on the longitudinal axis for moving the first axis circumferentially around the longitudinal axis between two extreme positions whereby the top dead centre position for the piston is able to be varied between a respective limit corresponding to each of the angular extremes for adjusting the compression ratio for the cylinder in which the piston is moveable. Alternatively, or additionally, the shaft may be adapted to be so mounted and adapted to receive drive by which it is rotatable on the longitudinal axis at half the rotational speed of the crankshaft for causing the first axis to orbit around the longitudinal axis for moving the piston in an Atkinson cycle mode.

In the one arrangement described above, the mounting device may comprise a shaft having a longitudinal axis co-incident with the first axis, the shaft forms part of the holding and adjusting device which includes a connecting link. That connecting link may extend laterally from the shaft and be pivotal by connected at one of opposite ends thereof to the link member at a location intermediate of the ends of the link member, with its other end pivotally connected to the shaft at a location spaced from the first axis. The shaft preferably is adapted to be mounted on, or secured to, the crankcase and is adapted to receive drive for reversibly rotating the shaft on the longitudinal axis and thereby draw the pivot connection between the connecting link and the shaft arcuately around the first axis and move the third axis towards or away from the first axis by pivoting of the link member on the fourth axis.

The oscillating member preferably is journalled on the shaft. The holding and adjusting device may be operable, by reversible rotation of the shaft, to pivot the link member between two extreme positions in one of which the third axis is at a maximum spacing from the first axis and enables a maximum stroke for the piston and in the other extreme position for the shaft the third axis is co-incident with the first axis for attaining a de-activated condition for the piston in which its stroke is zero.

In one form, the mounting device is a shaft which has a longitudinal axis co-incident with the first axis and on which each of the spaced portions of the oscillating member is journalled, the shaft forms part of the holding and adjusting device which includes a connecting link which extends laterally from the shaft at one of opposite ends thereof and is pivotally connected at one end to each of the link members at a location intermediate the ends of each link member, with its other end pivotally connected to the shaft at a location which is intermediate of the laterally spaced portions of the oscillating member and spaced from the first axis. In that form the shaft is preferably adapted to be mounted on, or secured to, the crankcase and adapted to receive drive for reversibly rotating the shaft on the longitudinal axis and thereby reversibly drawing the pivot connection between the connecting link and the shaft arcuately around the first axis and thereby move the third axis towards or away from the first axis by pivoting of the link members on the fourth axis. The holding and adjusting device preferably is operable, by reversible rotation of the shaft, to pivot the link members between two extreme positions in one of which the third axis is at maximum spacing from the first axis and enables a maximum stroke for the piston and in the other extreme position for shaft the third axis is co-incident with the first axis for attaining a de-activated condition for the piston in which the piston has zero stroke. Each of the laterally spaced portions of the oscillating member may define a respective sleeve by which the laterally spaced portion is journalled on the shaft, with the sleeve of each laterally spaced portion extending axially away from the other laterally spaced portion. The shaft may define a laterally open recess adjacent to the location at which the connecting link is pivotally connected to the shaft, the recess having a width axially of the shaft and a depth enabling edge portions of the link members to be received therein when the third axis is co-incident with the first axis.

In another form, the mounting device comprises a shaft having a longitudinal axis parallel to but laterally spaced from the first axis, with the shaft defining a first eccentric having an axis co-incident with the first axis and a second eccentric having an eccentric axis parallel to the longitudinal axis but laterally spaced from the longitudinal and first axes. Again; the shaft forms a part of the holding and adjusting device further including a connecting link which extends laterally from the shaft. The connecting link at one of opposite ends thereof is pivotally connected to the link member at a location intermediate the ends of the link member, but has its other end journalled on the second eccentric of the shaft, In that form; the shaft is adapted to be mounted on, or secured to, the crankcase and adapted to receive drive for rotating the shaft on the longitudinal axis for causing the first and eccentric axes to orbit around the longitudinal axis for moving the piston in an Atkinson cycle mode.

In a further form, the mounting device comprises a shaft having a longitudinal axis parallel to but laterally spaced from the first axis, the shaft defining two axially spaced eccentrics each having an axis co-incident with the first axis and a further eccentric located between the axially spaced eccentrics and having an eccentric axis parallel to the longitudinal axis but laterally spaced from the longitudinal and first axes. Each oscillating member is journalled on a respective one of the spaced eccentrics. The shaft forms a part of the holding and adjusting device further including a connecting link which extends laterally from the shaft. The connecting link at one of opposite ends thereof is pivotally connected to each link member at a location intermediate the ends of the link members, with the other end of the connecting link journalled on the further eccentric of the shaft. The shaft is adapted to be mounted on, or secured to, the crankcase and adapted to receive drive for rotating the shaft on the longitudinal axis for causing the eccentric axes to orbit around the longitudinal axis for moving the piston in an Atkinson cycle mode.

At its other end, the link member is adapted for pivotably connecting to the remote end of the con rod on which the piston is mounted so as to be pivotable relative to the con rod on a third axis which is spaced from the second axes and parallel to the first and second axes. Also, at the second axis, the oscillating member is adapted for pivotally connecting to a little end of a further con rod, having a big end connectable to the crankshaft, for relative rotation between the oscillating member and the further con rod on the second axis. The arrangement is such that the link member and the oscillating member are pivotally connectable to the respective con rods so that the first axis and the crankshaft axis are positioned to opposite sides of an axis along which the piston reciprocates.

In a second aspect, the invention provides an internal combustion engine having a cylinder head and a crankcase, a plurality of cylinders defined by the cylinder head, a crankshaft journalled in the crankcase for rotation on a longitudinal axis of rotation, a respective piston in each cylinder, and a respective first con rod on one end of which each piston is mounted and from the remote end of which each piston is connected, via a respective rocking mechanism and a respective second con rod, to the crankshaft for transferring linear reciprocation movement of each piston in its cylinder to, and for rotating, the crankshaft. The rocking mechanism for at least one cylinder is a rocking mechanism according to the first aspect of the invention.

The rocking mechanism of the present invention, when used in an internal combustion engine, provides an adjustable motion transferring connection between a piston and the crankshaft of the engine. The oscillating member of the rocking mechanism is mounted on a structure of, or secured to, a crankcase for the engine for reversible oscillating movement, on a first axis parallel to the crankshaft axis. That is, when so mounted, the oscillating member is able to swing arcuately back and forth by reversibly turning on the first axis. Also, with the link member pivotally connected to the remote end of a con rod on which the piston is mounted, and the oscillating member connected to the little end of a con rod having a big end connected to the crankshaft, the second and third axes also are caused to move relative to the first axis in accordance with the oscillating movement of the oscillating member.

The oscillating member preferably is mounted on, or secured to, the crankcase by being mounted on a shaft having a longitudinal axis co-incident with the first axis. The shaft preferably is a control shaft which comprises part of the holding and adjusting device. Where the shaft is a control shaft of that device, there most preferably is a control link of the device which at respective ends is pivotally connected to the link member at a location between the second and third axes and to the control shaft. The holding and adjusting device is able to maintain a fixed relationship between the control shaft and the control link to maintain the rocking mechanism in a given condition, but able to change the relationship between the control shaft and the control link to vary the condition of the mechanism. In a given condition for the mechanism, the shaft is fixed relative to the oscillating member. However, the shaft is able to rotate in either direction on its axis relative to the oscillating member, to change the condition for the mechanism, and this relative movement can occur during operating movement of the oscillating member. Rotation of the control shaft causes the control link to pivot the link member on the second axis relative to the oscillating member, to move the third axis towards or away from the first axis. The arrangement is such that the third axis can be adjusted, as required, between two extreme positions, with the third axis preferably being co-incident with the first axis in one of those extreme positions.

With movement of the third axis, the stroke of the piston is varied. When, as in a preferred arrangement, the third axis is able to be moved to be co-incident with the first axis, the piston stroke is able to be reduced to zero and the piston is immobilised, although movement of the oscillating member is able to continue in response to rotation of the crankshaft on its axis.

The rocking mechanism of the present invention enables attainment of a number of significant practical benefits with an engine in which it is provided. One benefit is that, as with the mechanism of WO2004/061270 and U.S. Pat. No. 7,174,863, it facilitates location of the crankshaft in a position laterally spaced with respect to the lines along which the pistons are movable. However, in contrast to the mechanism of WO2004/061270 and U.S. Pat. No. 7,174,863, the first axis and the crankshaft axis are at opposite sides of an axis along which the piston reciprocates. This has the important practical benefit of allowing the crankshaft to have a smaller spaced relative to the piston axis. This smaller spaced enables a more compact and lighter engine which is able to be more easily coupled to a transmission within the engine bay.

The smaller crankshaft spaced considerably improves the provision of variable piston stroke and piston de-activation in a V-type engine configuration. This is because the smaller spaced enables an engine of that configuration to have a crankshaft disposed substantially centrally with respect to the line of cylinders of each bank or half of the engine. Moreover, unlike the mechanism of WO2004/061270 and U.S. Pat. No. 7,174,863, the mechanism of the present invention makes possible a flat engine having opposed banks of cylinders in which all pistons are movable in the one plane. The engine may be of the type known as a boxer engine, also known as a horizontally opposed engine, in which the pistons of an in-line pair reach top dead centre simultaneously. Alternatively, the engine may be of the so called "180° V" engine type in which each piston of an opposed pair reaches top dead centre half a crankshaft turn after the other piston of the pair. In one form of the "180° V" engine, the pistons of each opposed pair are rigidly inter-connected, preferably in an integrally formed arrangement, by a split spacer bar within which the rocking mechanism is disposed. Thus, for example, the pistons of each opposed pair may be spaced by two elongate, laterally spaced connectors with which the pistons either are formed integrally or made integral, with the rocking mechanism disposed between the elongate connectors.

Flat engine arrangements are not possible, as a practical matter, with the rocking mechanism of WO2004/061270 and U.S. Pat. No. 7,174,863. However, they are highly beneficial in providing an engine which not only is able to be very compact, but also is suited to low profile vehicle front end designs and enables the vehicle centre of gravity to be lowered to enhance vehicle handling.

In one form, the rocking mechanism according to the invention has two oscillating members which are secured in spaced relation along the first and second axes. Also, in that one form, the mechanism has two link members which are secured in spaced relation along the first and second axes. The two oscillating members move in unison, preferably in a substantially parallel spaced relationship. Also, the two link members are pivotable in unison on the second axis, preferably in substantially parallel spaced relationship with each adjacent to a respective oscillating member. The two oscillating members and the two link members are pivotally connected at the second axis, most preferably on a common pivot pin by which the oscillating members are pivotally connectable to the little end of the con rod connectable to the crankshaft.

Particularly in that form of the rocking mechanism, the benefits provided by the invention can be facilitated by modification of the respective con rod by which the mechanism is coupled to each of the piston and to the crankshaft. In the case of the first con rod, that is the con rod on which the piston is mounted, the end remote from the piston defines oppositely extending, integral pins on each of which a respective one of the link members is journalled for relative pivoting between the link members and the con rod on the third axis. Also, the remote end of the first con rod most conveniently is bifurcated to define a recess which allows clearance for a side portion of the second con rod to be received into the recess. The second con rod, that is the one connectable to the crankshaft, may have an elongate shank between its big and little ends which is shaped at one side to a form enabling it to be received with clearance into the recess defined at the end of the first con rod. Thus, in the course of relative movement between the con rods in each cycle of reciprocation of the piston, the shaped side is able to be received into, and move out of, the recess.

In one arrangement it is desirable to have a first con rod with a bifurcated end defining a recess into which a shaped side of the second con rod is receivable during relative movement between the con rods. However, in other arrangements, the con rods may simply move to and away from a close juxtaposition in each cycle of piston reciprocation. In another arrangement, the second con rod may be constructed to have an spaced stem such that it clears the first conrod at the location where they come in close proximity. This avoids the need to create a bifurcated recess in the first conrod. These arrangements still allow the smaller crankshaft spaced, as well as the compact engine form, enabled by the rocking mechanism of the present invention.

The oscillating member may have extensions by which it is journalled, for oscillating movement on the first axis, in each of two webs of the crankcase which extend laterally with respect to the crankshaft. Where there are two oscillating members secured in spaced relation, each has a respective extension by which it is journalled in a respective one of the webs. In each case, the extensions may be extension sleeves and, in that case, the holding and adjusting device may include a control shaft which is journalled in the extension sleeves and which preferably extends to each of the webs. Where there are two oscillating members each having a respective extension sleeve in which a control shaft is journalled, the control shaft may be enlarged, at a region between the two oscillating members, in a manner maintaining the two oscillating members in spaced relation.

Where the holding and adjusting device includes a control shaft journalled in the extension sleeves, the device may also include a control link acting between the control shaft and the link members. The control link may be pivotally connected at one end to the control shaft so as to be pivotable on an axis parallel to but spaced from the first axis, and pivotally connected at the other end to the link members. The arrangement is such that with rotation of the control shaft relative to the oscillating members, the link members pivot on the second axis relative to the oscillating members to move the third axis to or away from the first axis. Where the third axis is to be able to become co-incident with the first axis, the control shaft defines a recess into which the ends of the link members are receivable.

It is possible for an engine to have an in-line cylinder configuration with each piston connected to the crankshaft by a respective rocking mechanism. However, if the mechanism is to enable pistons to be immobilised, there needs to be at least one piston which is not able to be de-activated. Thus, at least one piston may be connectable to the crankshaft through an alternative form of oscillating member. The alternative form of oscillating member may, for example, be directly pivotally connected to the first con rod for the respective piston. This type of fixed geometry oscillating member journalled on an eccentric of an adjusting shaft either rotating or rotationally adjustable on the first axis, can also be adapted for a variable compression ratio engine.

However, different embodiments of the rocking mechanism of the present invention enable further, more important benefits. These include:
(a) an engine adjustable to enable piston de-activation.
(b) an engine adjustable for operation with either a maximum stroke setting or a minimum stroke setting;
(c) an engine adjustable for operation at any stroke setting from a maximum setting to a minimum setting;
(d) an engine able to operate as an Atkinson Cycle engine with or without an independent variable compression ratio; and
(e) an engine able to operate as a variable compression ratio engine with moderate Atkinson Cycle effect.

Arrangements enabling piston de-activation are possible with either an in-line, or a V-type or a flat cylinder configuration. Also, in a variant on the V-type configuration, it is possible for each bank of cylinders to be parallel, opposed or in a common plane, rather than in a mutually inclined V-shaped arrangement. In embodiments enabling variable stroke, Atkinson Cycle or variable compression ratio, operation, the engine may be in-line or of a V-type.

GENERAL DESCRIPTION OF THE DRAWINGS

In order that the invention may be more readily understood, description now is directed to the accompanying drawings, in which.

Figure 25:
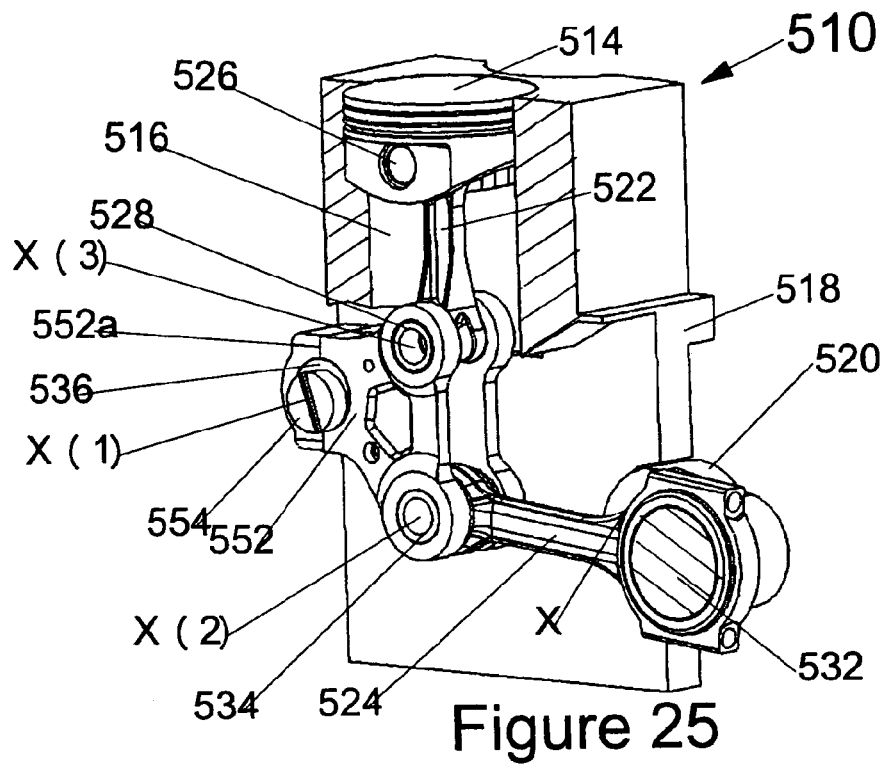
Figure 26:
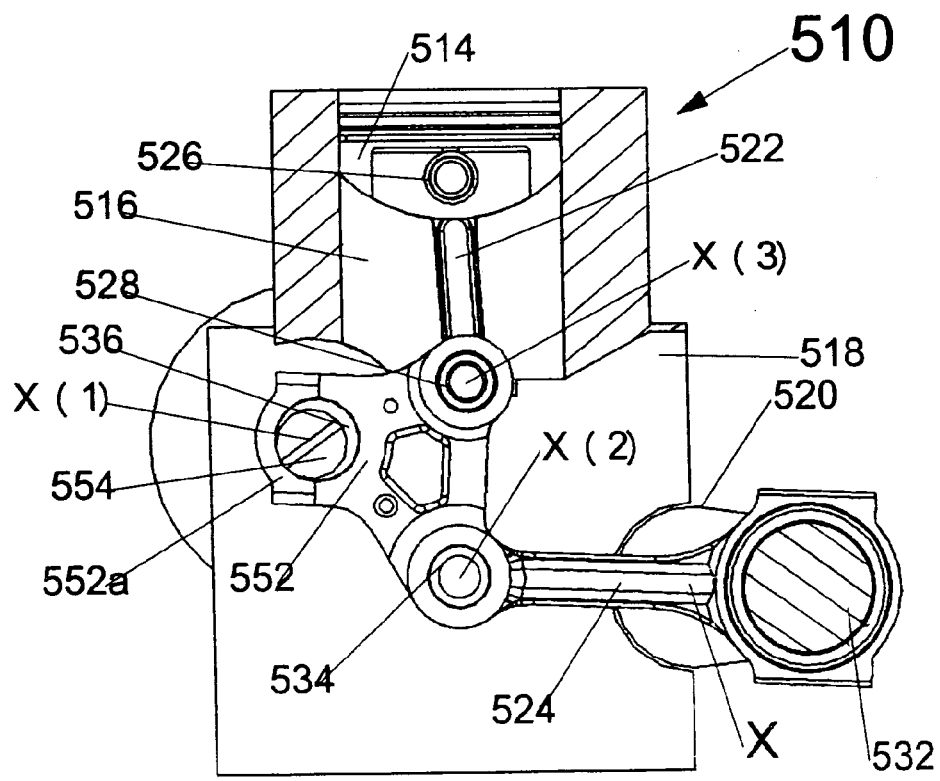

FIG. 25 is an isometric part cross sectional view through a piston/crank assembly of an in-line variable compression ratio engine according to an eighth embodiment of the present invention showing the piston in the top dead centre position and at maximum compression ratio position; and FIG. 26 is a partial vertical cross section of FIG. 25 showing the piston in the top dead centre position at minimum compression ratio position.

DETAILED DESCRIPTION OF THE DRAWINGS

In the preceding general description, there is reference to a link member or laterally spaced link members being pivotally connected to the oscillating member on a fourth axis. That description indicates that the fourth axis is co-incident with or adjacent to the second axis. While some limited spacing between the second and fourth axes is acceptable, it is preferred that those axes are co-incident. In either case, it is necessary that the first and third axes are substantially equidistant from the second axis. While the second and fourth axes can be adjacent, rather than co-incident, it is to be understood that in the following drawings the second and fourth axes are co-incident for ease of illustration. Accordingly, the fourth axis is not identified for the same reason and, hence, it is not otherwise referred to.

FIGS. 1 to 4 illustrate an engine 10 according to a first embodiment of the present invention which incorporates a rocking mechanism 12 according to the present invention. More specifically, the mechanism 12 provides means by which one piston 14 of a plurality of pistons of the engine 10 can be completely de-activated and re-activated as required. The activation/de-activation may be while the engine is in motion, even in motion at a fast rate, as demanded by a vehicle in which the engine 10 is provided, via sensors (not shown) and an engine management system (also not shown). The cylinders 16 are closed, at the open end shown, by a cylinder head (not shown) which is provided with the usual inlet and outlet ports, valves, actuating gear and ignition means (none of which is shown).

The engine 10 may have more than one (or even all) of its pistons each provided with a respective mechanism 12. However, as will be understood, the engine 10 needs to have at least two pistons 14 of which at least one needs to remain active at all times the vehicle is in motion. Once the vehicle has become stationary and the ignition turned off, any piston not previously de-activated can be de-activated by the vehicle management system.

Engine 10 includes a cylinder block represented by the one cylinder 16 shown which houses the one piston 14 shown. The arrangement is that of a multi-cylinder engine in which the cylinders are in an in-line configuration extending perpendicular to the plane of FIG. 1. Extending from the cylinder block, engine 10 further includes a crankcase 18 which houses rocking mechanism 12 and, off-set to one side of the line of cylinders, a crankshaft 20 which has an axis X and which extends through and is journalled in webs (not shown) of crankcase 18 and crankcase cover 40. The piston 14 is mounted on one end of a first con rod 22 by a gudgeon pin 26, while a second con rod 24 has its big end journalled on a crankpin 20a of crankshaft 20. The piston 14 is drivingly connected to the crankshaft 20 by rocking mechanism 12 acting between the end of con rod 22 remote from piston 14 and the little end of con rod 24. The mechanism 12 is located between a pair of transverse webs 33 (of which only one is shown) of crankcase 18 which separate the space below cylinder 16 from the space below the, or each, next cylinder.

The rocking mechanism 12 has a pair of parallel, laterally spaced, elongate oscillating members 28. At one end, each of members 28 has a trunnion sleeve extension 38. A control shaft 36 of mechanism 12 has a respective end portion 36a journalled in each sleeve extension 38, while each sleeve extension 38 is journalled in a bore of a respective web 33 of crankcase 18. Relative rotation between shaft 36 and sleeve extensions 38 is facilitated by a respective bearing 39 concentric with each end portion 36a. The arrangement is such that sleeve extensions 38 are co-axial with control shaft 36 on axis X(1). As shown, axis X(1) is parallel to, but spaced from, axis X of crankshaft 20, with axes X and X(1) on opposite side of an axis Y-Y of piston 14. Thus, oscillating members 28 are able to oscillate or rock pivotably on axis X(1), while control shaft 36 is able to rotate on axis X(1).

The rocking mechanism 12 also includes a parallel pair of laterally spaced links 30, and a holding device 32. The links 30 are connected to the ends of oscillating members 28 remote from axis X(1) on pin 34. The arrangement enables relative pivoting between members 28 and links 30 on an axis X(2) of pin 34, with axis X(2) parallel to, but spaced from, each of axes X and X(1). In the arrangement shown, links 30 are spaced by pin 34, with each adjacent to a respective one of members 28. Also, pin 34 provides a common connection not only for members 28 and links 30, but also for the little end of the second con rod 24. In the arrangement shown, the little end of con rod 24 is journalled on pin 34 between the links 30.

At the end of links 30 remote from axis X(2), links 30 are pivotally connected to the end of the first con rod 22 remote from piston 14. The links 30 are able to pivot relative to con rod 22 on an axis X(3) which is parallel to, but spaced from, axes X, X(1) and X(2). Of course con rod 22 also is able to pivot on gudgeon pin 26. As shown most clearly in FIG. 3b, the end of con rod 22 remote from piston 14 has two oppositely extending, integral pins 22a and 22b which are concentric with axis X(3) and on each of which a respective one of links 30 is journalled. Also, between pins 22a and 22b, that end of con rod 22 is bifurcated to define a recess 22c. At the lower extremity of the travel of con rod 22 with piston 14, the recess 22c allows clearance enabling a side of con rod 24 to be received in recess 22c.

As will be appreciated from description to this stage, the driving connection provided by mechanism 12 between piston 14 and crankshaft 20, enables the linear reciprocating motion of piston 14 along its axis Y-Y to impart required rotary motion to crankshaft 20. The mechanism 12 is such that, by operation of holding device 32, the driving connection can be maintained while allowing variation in the stroke of piston 14. Also, in a limiting condition for mechanism 12, the stroke of piston 14 is reduced to zero, while still allowing rotary motion of crankshaft 20 in response to reciprocating motion of at least one other piston.

Figure 1:
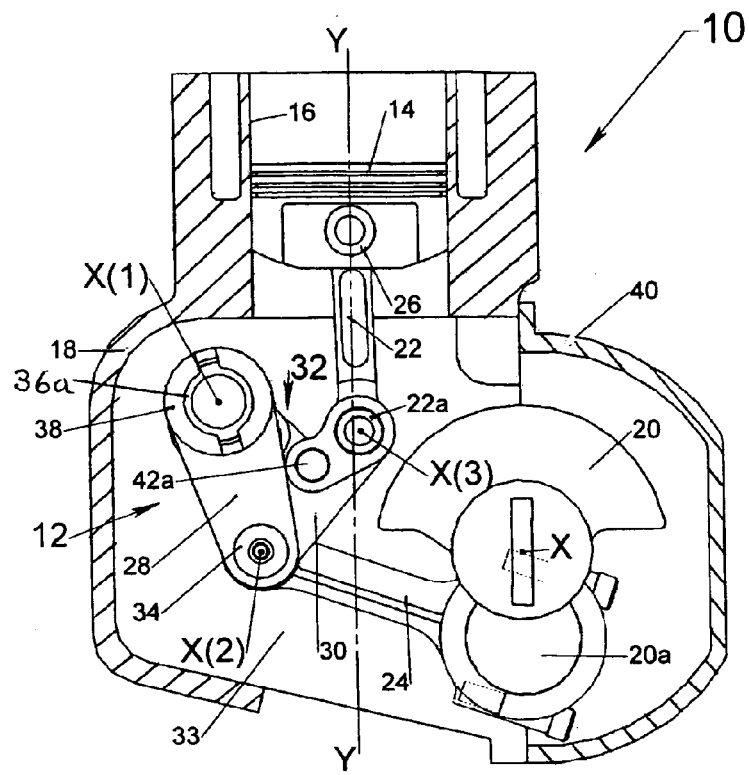
FIG. 1 is a partial vertical cross section through a piston/crank assembly of an in-line piston de-activation engine according to a first embodiment of the present invention showing the positioning of the main components to achieve a compact arrangement, with the piston in the activated position.

The holding device 32 includes control shaft 36 and a link 42. Control shaft 36 and links 30 are coupled by link 42 in a manner which enables mechanism 12 to be held in one of, or adjusted between, two extreme conditions. The first of those positions is an activated condition shown in FIGS. 1 and 2 in which piston 14 is able to reciprocate with its intended stroke. The second of those positions is a de-activated condition shown in FIG. 3, in which piston 14 is held against reciprocating movement. In adjustment between the activated and de-activated conditions, the stroke of piston 14 changes progressively to and from a maximum in the activated condition. However, the principal benefit of the arrangement of FIG. 1 is in enabling piston de-activation, rather than effective variable stroke, as the top dead centre for piston 14 is at the top of cylinder 16 only in the activated position. As the stroke shortens the distance of the dead centre portion from the top of cylinder 16 increases, with increasing difficulty in achieving compression sufficient for effective fuel combustion. However, with limited stroke shortening, the arrangement of FIG. 1 can be used to vary the compression ratio.

In the activated condition, in which piston 14 reciprocates with its full stroke, link 42 holds links 30 at a fixed angle relative to oscillating members 28. In the activated condition, axes X(1), X(2) and X(3) are fixed relative to each other, but able to oscillate on axis X(1). Thus, in the activated condition, control shaft 36, members 28 and links 30 are fixed relative to each other, but able to oscillate as an assembly on axis X(1); that is, the assembly is able to oscillate with rotational oscillation of shaft 36.

Mechanism 12 is able to be reversibly adjusted between the activated and de-activated conditions and, while piston 14 is prevented from reciprocating in the de-activated condition, mechanism 12 remains operable to enable rotation of crankshaft 20 under the action of another piston. The adjustment to the de-activated condition is such that the angle between members 28 and links 30 is reduced from a maximum at which the stroke for piston 14 is a maximum, to a lesser angle at which the stroke for piston 14 is reduced to zero. In such variation, axis X(3) is drawn towards axis X(1) and, in the limiting condition in which piston 14 is stationary or de-activated and has zero stroke, axes X(1) and X(3) are co-incident.

Figures 3C, 24:
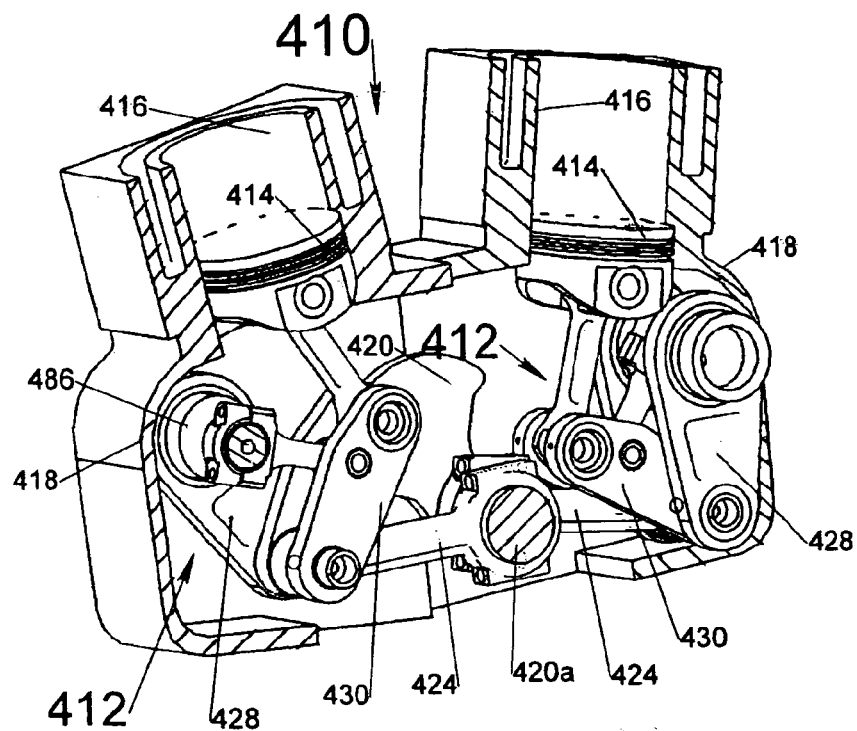
FIG. 3c is an isometric and partial cross sectional view of a piston/crank assembly similar to FIG. 1 showing an alternative main conrod.
FIG. 24 is an isometric part cross sectional view of variable stroke V-type engine of FIG. 23.

The ability of mechanism 12 to adjust is enabled by the connection link 42 makes with control shaft 36, and is achieved by rotation of shaft 36 relative to members 28. As is evident from FIGS. 3a and 3b, a central region of shaft 36 defines a recess or cavity 44 which opens laterally of shaft 36, between the respective end portions 36a of shaft 36. The recess or cavity 44 has a width longitudinally of shaft 36 enabling recess or cavity 44 to receive therein the ends of links 30 between which the remote end of con rod 22 is journalled, as required to enable axis X(3) to approach and achieve co-incidence with axis X(1). Also, to each side of cavity 44, shaft 36 has a respective one of a pair of longitudinally spaced lugs 45 each defining a respective bore 46. The bores 46 are aligned on a common axis which is parallel to but laterally spaced from axis X(1). One end of link 42 is connected to shaft 36 by being journalled on a pin 48 held captive in the bore 46 of each lug 45. The other end of link 42 defines two integral but oppositely extending pins 42a and 42b which are axially in-line. On each of pins 42a and 42b a respective one of links 30 is pivotally journalled at a location intermediate axes X(2) and X(3), but preferably nearer to axis X(3). The end of link 42 at which pins 42a and 42b are located also defines a slot 50 which, like recess 22c of con rod 22, is to provide clearance enabling a side of con rod 24 to be received in slot 50 at the lower extremities of travel of that end of link 42. However, as shown in FIG. 3c, an alternative to providing slot 50 at the end of link 42, and recess 22c of con rod 22, is to construct con rod 24 with a shank 24a which is spaced from a line between centres of its big and little ends so that it does not interfere with con rod 22 and link 42.

Rotation of shaft 36, to adjust mechanism 12 by varying the angle between members 28 and links 30, occurs relative to members 28. This rotation of shaft 36 relative to members 28 is distinguished from oscillating movement of members 28 since, when this relative rotation is not occurring, shaft 36 oscillates in unison with oscillation of members 28 due to the coupling provided by link 42 between shaft 36 and links 30. The rotation of shaft 36 relative to members 28 can occur with members 28 stationary or simultaneously with oscillating of members 28. Thus, the adjustment of mechanism 12 can occur while the engine 10 is in motion, even in motion at a fast rate. Also, subject to use of an external power source such as an electric motor, the adjustment can occur with engine 10 not in motion.

Figure 2:
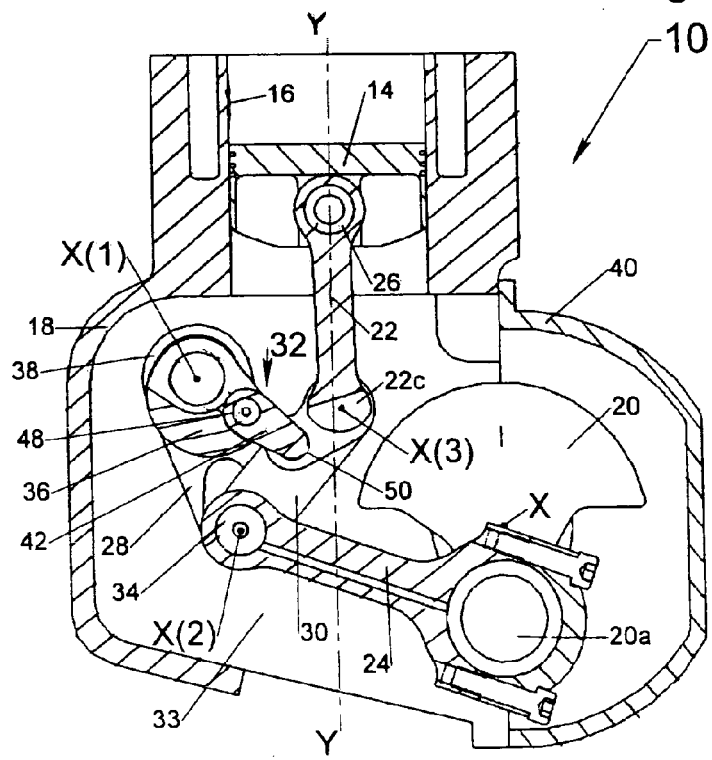
FIG. 2 is a cross sectional view through the piston/crank assembly of FIG. 1 with the piston in the activated position.
Figure 4:
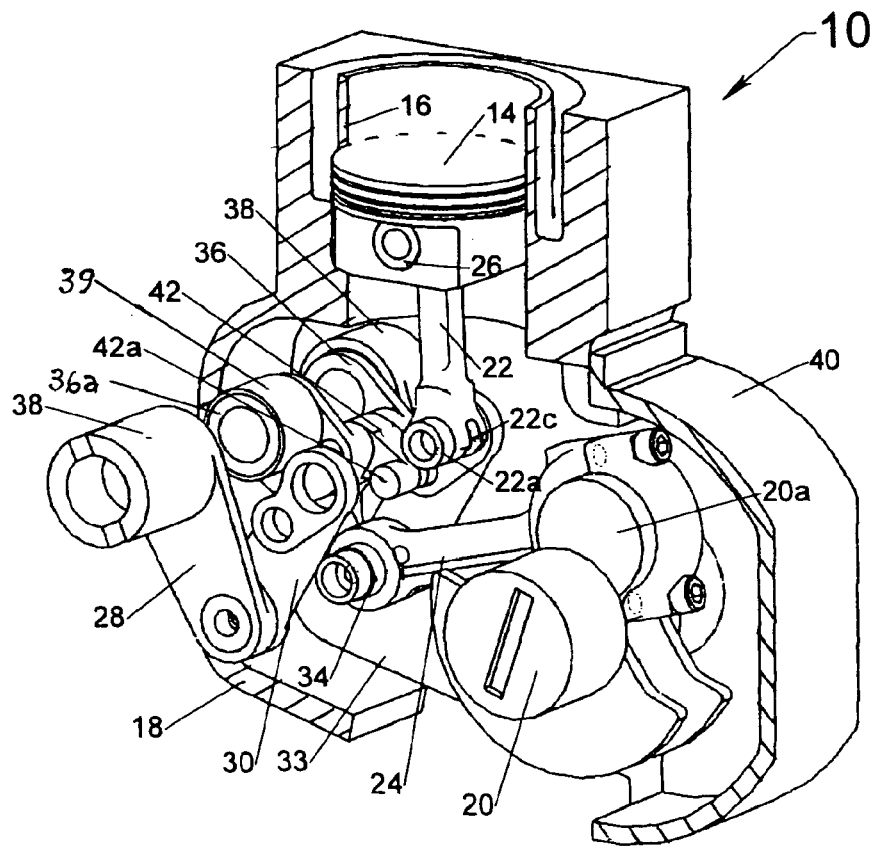
FIG. 4 is an isometric and partially exploded view of the piston/crank assembly of FIG. 1.

As engine 10 is seen in FIGS. 1, 2 and 4, the angle between oscillating members 28 and links 30 is at a maximum with link 42 fully extended laterally from the axes of control shaft 36 and pin 48. This condition is achieved by the relative rotational movement between control shaft 36 and the oscillating members 28. In this condition piston 14 is activated at the maximum stroke position.

Figure 3:
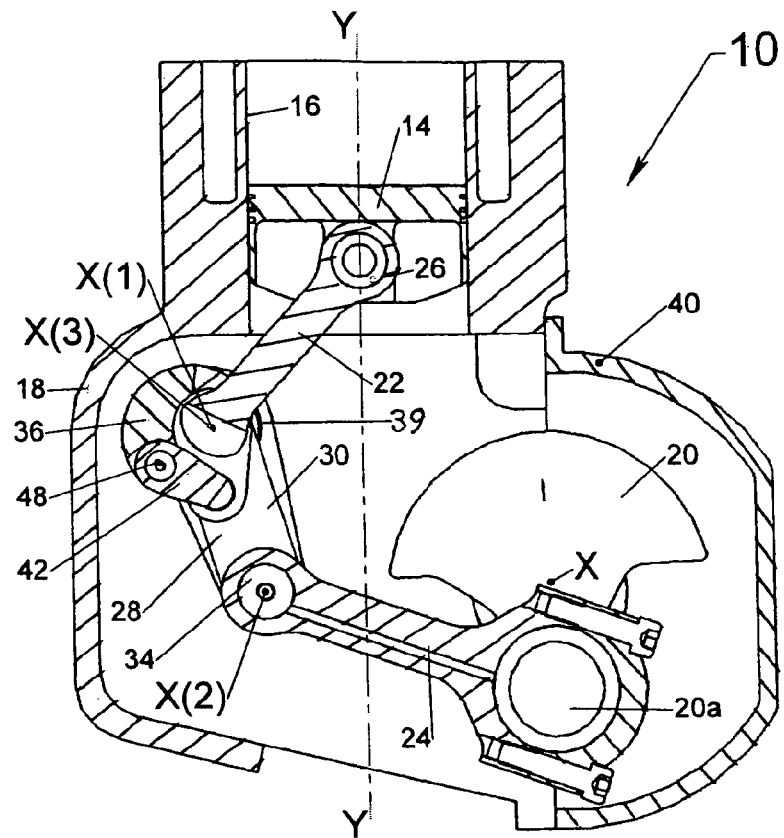
FIG. 3 is a cross sectional view through the piston/crank assembly of FIG. 1 with the piston in the de-activated position.
Figure 3A:
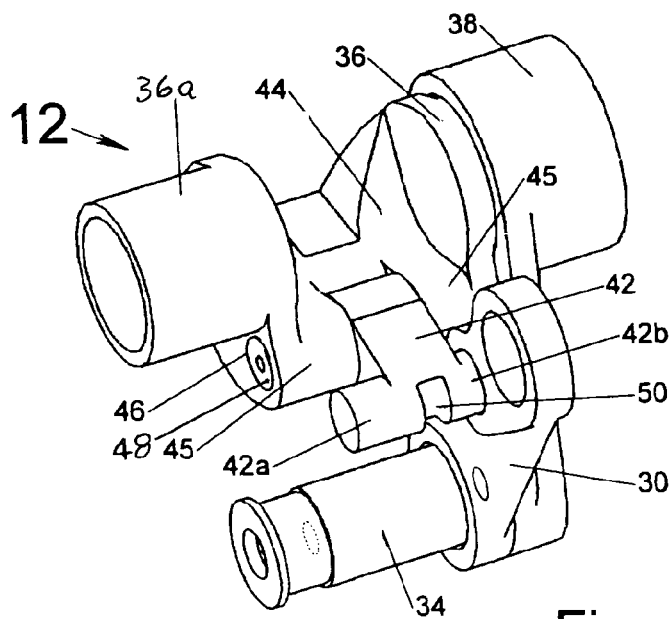
FIG. 3a is an isometric view of a partial assembly of components of the assembly of FIG. 1.
Figure 3B:
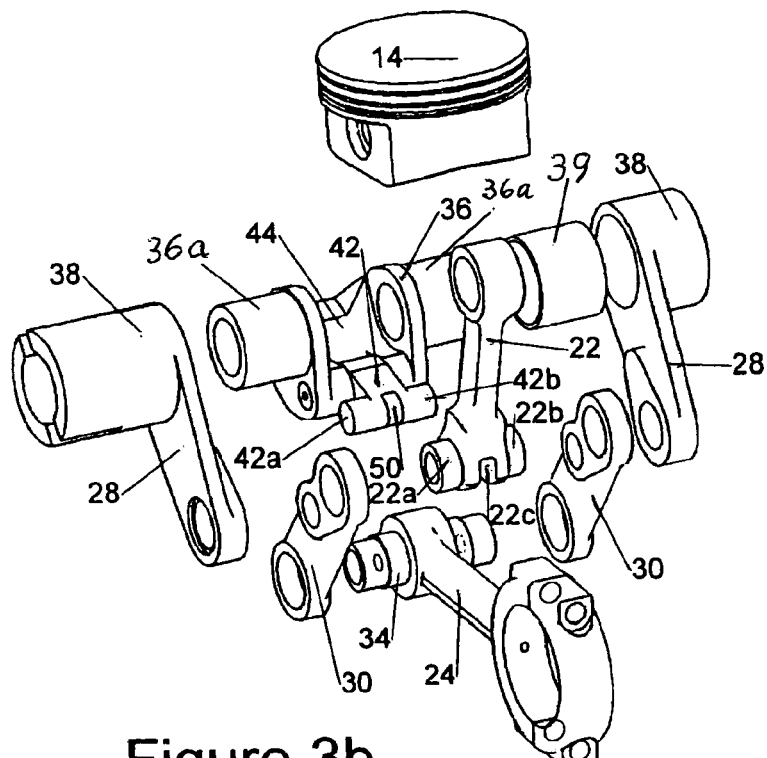
FIG. 3b is a further isometric and partly exploded view of components of the assembly of FIG. 1.

FIG. 3 shows the engine after adjustment of the rocking mechanism to achieve the piston de-activation mode by rotation of the control shaft 36, clockwise in the orientation shown, relative to the oscillating members 28. That rotation of shaft 36 causes links 30 to pivot on pin 34 to decrease the angle between members 28 and links 30 to zero. On attaining that angle axis X(3) of pins 22a and 22b of con rod 22 becomes co-incident with axis X(1) of control shaft 36, and piston 14 then has zero stroke. However oscillating member 28 is able to continue to oscillate, due to crankshaft 20 being rotated by other pistons and resultant movement of second con rod 24.

Figure 5:
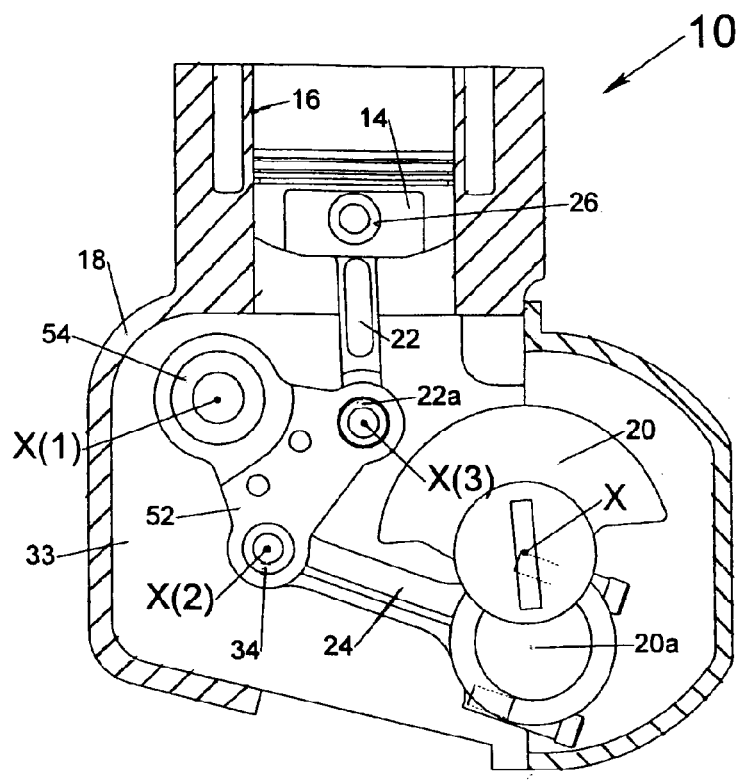
FIG. 5 is a part cross sectional view of a piston/crank assembly with a fixed oscillator complementing the requirement of a multi-cylinder engine of FIG. 1.

In engine 10, at least one piston must remain active to maintain rotational movement of crankshaft 20. For this, and to maintain the integrity of the engine structure, a fixed geometry oscillating mechanism with the same geometric relationship between the axes X(1), X(2) and X(3) of the rocking mechanism 12 needs to be incorporated in engine 10 for the one piston to remain active. FIG. 5 shows a preferred embodiment of a fixed rocking mechanism. This has an oscillating member 52 which is rotationally mounted and journalled on shaft 54 fixed to webs of crankcase 18 with the balance of the components required to complete the rocking mechanism retaining the same numerals referenced in FIG. 1.

The member 52, as illustrated, is of somewhat triangular form, but it could have another shape. On axes X(1), X(2) and X(3), which are the same axes so designated in FIGS. 1 to 4, a respective apex of member 52 is journalled on shaft 54, a pin 34 on which con rod 24 also is journalled, and a pin 22a of con rod 22, respectively. Member 52 is normally mated to a mirror image of itself and bolted together to provide pin connections at X(2) and X(3). Shaft 54 is fixed on webs 33 of crankcase 18 on axis X(1).

The engine 10 as in FIGS. 1 to 4, having at least one piston with a mechanism as in FIG. 5, will allow a number of in-line engine embodiments. For example, a three cylinder engine can be configured with a middle cylinder having a fixed rocking mechanism as in FIG. 5 and two outer cylinders having rocking mechanisms with piston de-activation capability as in FIGS. 1 to 4. Also, a four cylinder engine can have the middle two cylinders with fixed mechanisms and the outer two pistons able to be de-activated.

In relation to FIGS. 1 to 4, reference to the angle between members 28 and links 30 most preferably is to be understood as reference to the angle between their centre-lines. The centre-lines are the line through axes X(1) and X(2) for members 28, and axes X(2) and X(3) for links 30.

Figure 6:
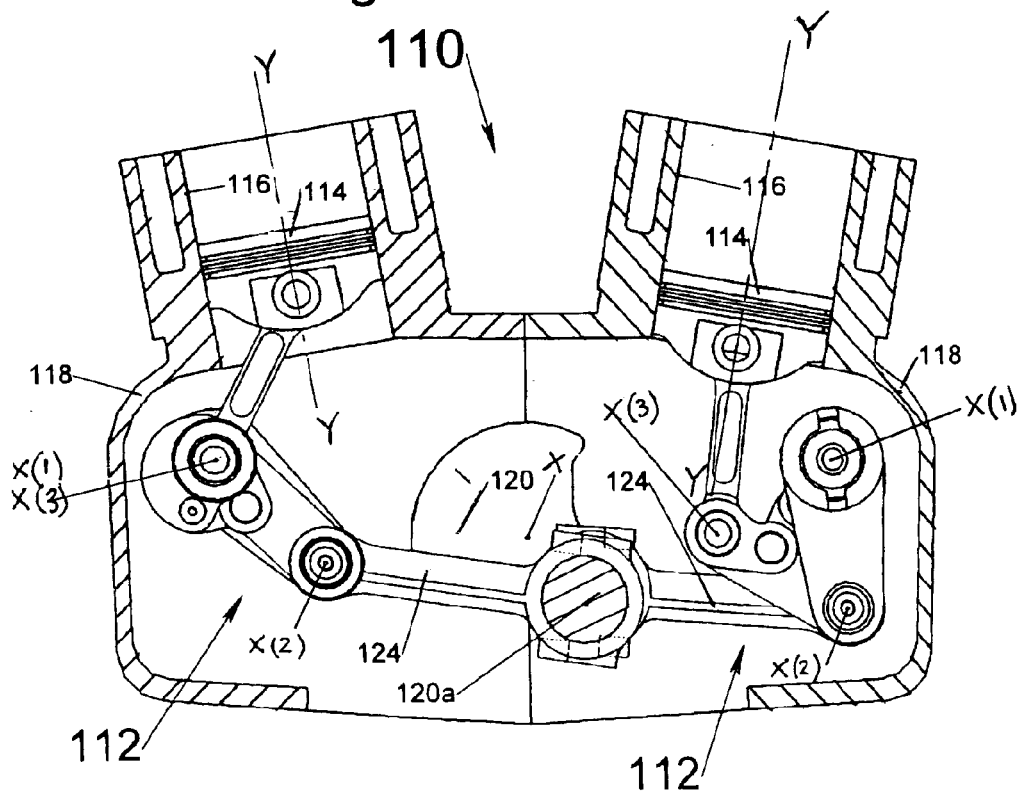
FIG. 6 is a partial vertical cross section through a piston/crank assembly of a V-type piston de-activation engine according to a second embodiment of the present invention showing one piston in the activated position and the opposite piston in the de-activated position.
Figure 7:
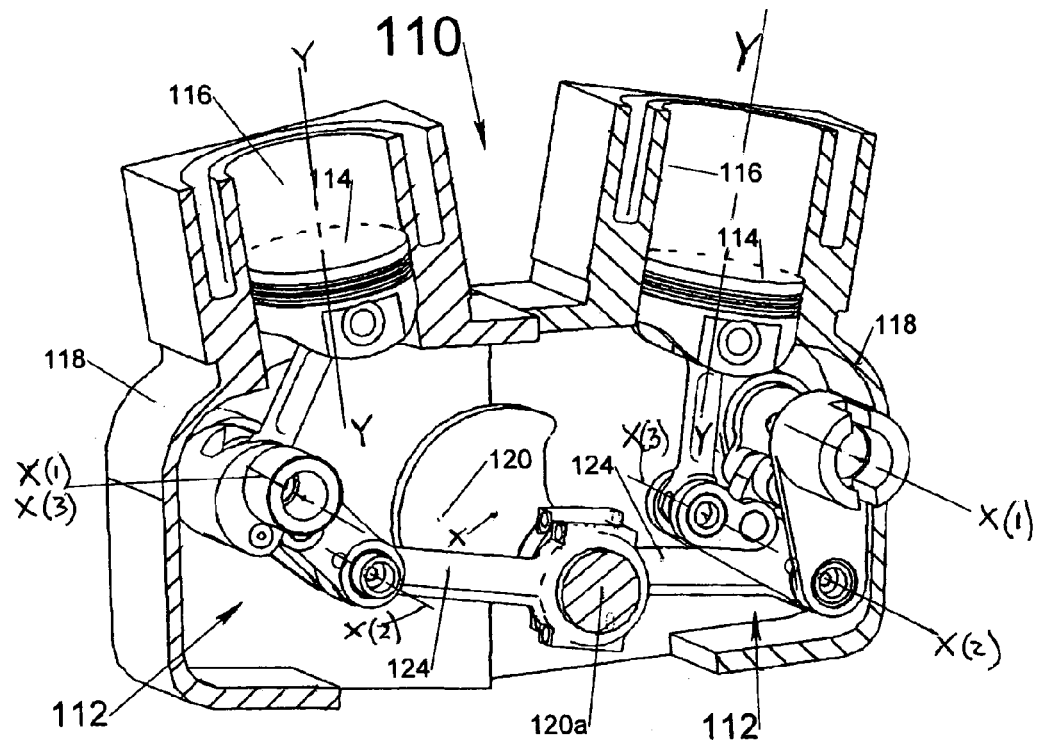
FIG. 7 is an isometric and partially exploded view of the piston/crank assembly of FIG. 6.
Figure 8:
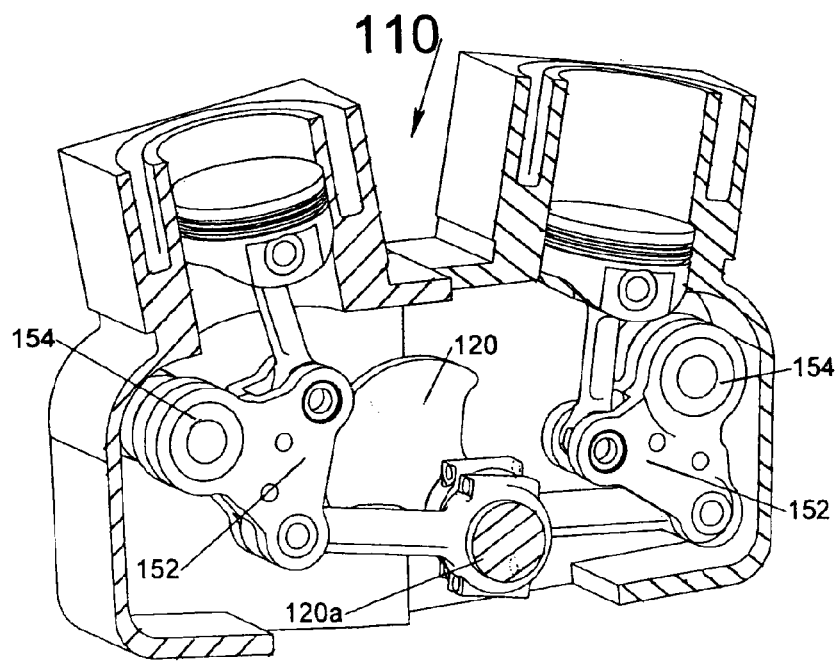
FIG. 8 is an isometric view of a piston/crank assembly with fixed oscillators complementing the requirement of a multi-cylinder V-type engine of FIG. 6.
Figure 9:
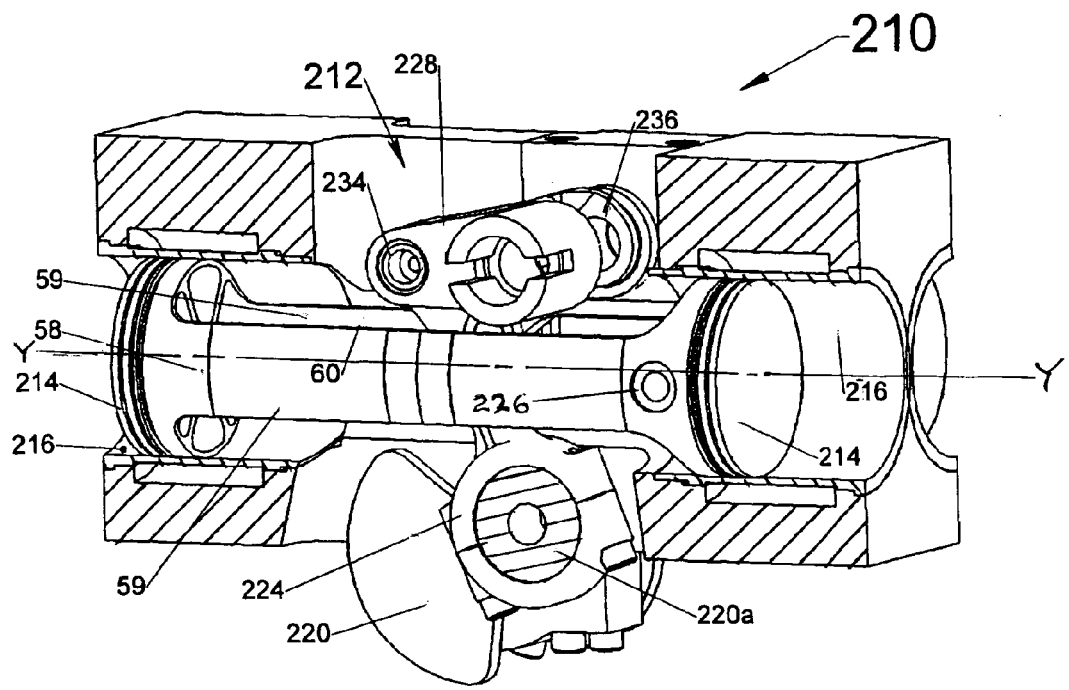
FIG. 9 is an isometric part cross section view through a piston/crank assembly of a multi-cylinder horizontally opposed piston de-activation engine according to a third embodiment of the present invention showing a double ended piston in the activated position.

FIGS. 6 to 8 illustrate an engine 110, according to a second embodiment of the present invention, that incorporates a pair of rocking mechanisms 112 configured in a V-type cylinder arrangement. Many components of the engine in FIGS. 6 to 8 are similar to those in FIGS. 1 to 5 and, where this is the case, the same reference numerals plus 100 are used. Also, as functioning of engine 110 generally will be understood from the description in relation to FIGS. 1 to 5, the description of engine 110 will be limited to principal features by which it differs from engine 10.

Each of the two pistons 114 and cylinders 116 shown has a respective axis Y-Y. The V-type cylinder arrangement of engine 110 has respective rocking mechanisms 112 for the piston 114. The mechanisms 112 are mounted in crankcases 118 in a mirror image of each other, but spaced along axis X by an amount to allow the respective con rods 124 to be mounted on the same crankpin 120a of a common crankshaft 120. The angle of the V can be varied such as from zero (in which the cylinders 116 are parallel) to 90 degrees. However, it is more appropriate to limit the angle to approximately 30 degrees. An isometric view of engine 110 is shown in FIG. 7.

Similarly to engine 10, the axes X and X(1) are spaced to opposite sides of axis Y-Y. Also, the piston 114 of at least one cylinder 116, preferably a respective piston in each bank of cylinders 116, must remain active at all times to maintain rotational movement of crankshaft 120. For such active pistons, and to maintain the integrity of the engine structure, at least one piston 114 of the engine 110 has a fixed geometry oscillating mechanism. Such a mechanism is shown in FIG. 8 for a pair of pistons with oscillating members 152 mounted and journalled on shafts 154. The engine 110 can be configured as a V-4; or a V-6 with a centre section of fixed mechanisms; or a V-8 preferably with the two centre sections as fixed mechanisms. The fixed mechanism most preferably is centrally disposed but, as with engine 10, other arrangements are possible.

As can be seen in FIG. 6, each piston 114 of an opposed pair can be activated and de-activated independently of the other, under the control of an engine management system (not shown). In each of FIGS. 6 and 7, the left hand piston 114 is in the de-activated condition, while the right hand piston 114 is in its activated condition.

FIGS. 9 to 12 illustrate an engine 210 according to a third embodiment of the present invention that incorporates a rocking mechanisms 212 configured in a horizontally opposed cylinder arrangement. Many components of the engine in FIGS. 9 to 12 are similar to those in FIGS. 1 to 5 and, where this is the case, the same reference numerals plus 200 are used. Also, as functioning of engine 210 generally will be understood from the description in relation to FIGS. 1 to 5, the description of engine 210 will be limited to principal features by which it differs from engine 10.

The horizontally opposed cylinder arrangement of engine 210 has a rocking mechanism 212 mounted in crankcase 56 having two opposed banks of cylinder bores 216 with each cylinder 216 of one bank axially in line with a respective cylinder 216 of the other bank. A one piece double ended piston member 58 defines a respective piston 214 for each in line pair of cylinders 216, with pistons 214 joined by a laterally spaced pair of elongate members 59. An internal cavity 60 is defined between members 59 and allows the rocking mechanism 212 to operate within this cavity 60 while the piston member 58 moves between the limits of the engine stroke. Only one rocking mechanism 212 (that is similar to rocking mechanism 12 in FIGS. 1 to 4), one con rod 222 and one con rod 224 is required for each double ended piston member 58 thus reducing the number of components in an engine arranged in this manner relative to a V-type engine arrangement. The double ended piston member 58 is connected to con rod 222 by a pin 226, similar to pin 26 of FIGS. 1 to 4, located at one of the pistons 214.

Figure 10:
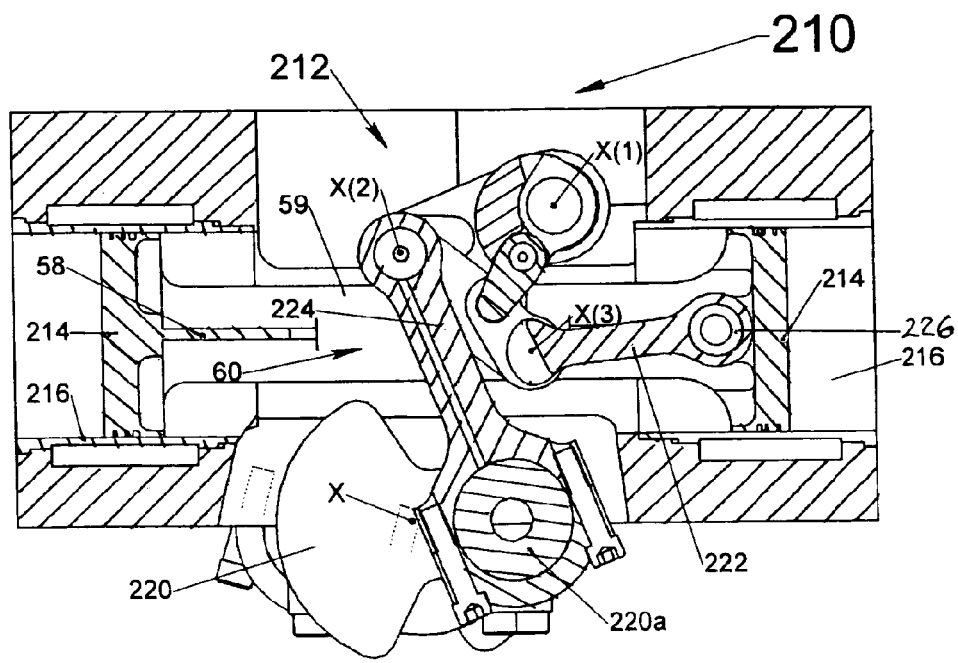
FIG. 10 is a cross section view through a piston/crank assembly of the multi-cylinder horizontally opposed piston de-activation engine of FIG. 9 showing a double ended piston in the activated position.
Figure 11:
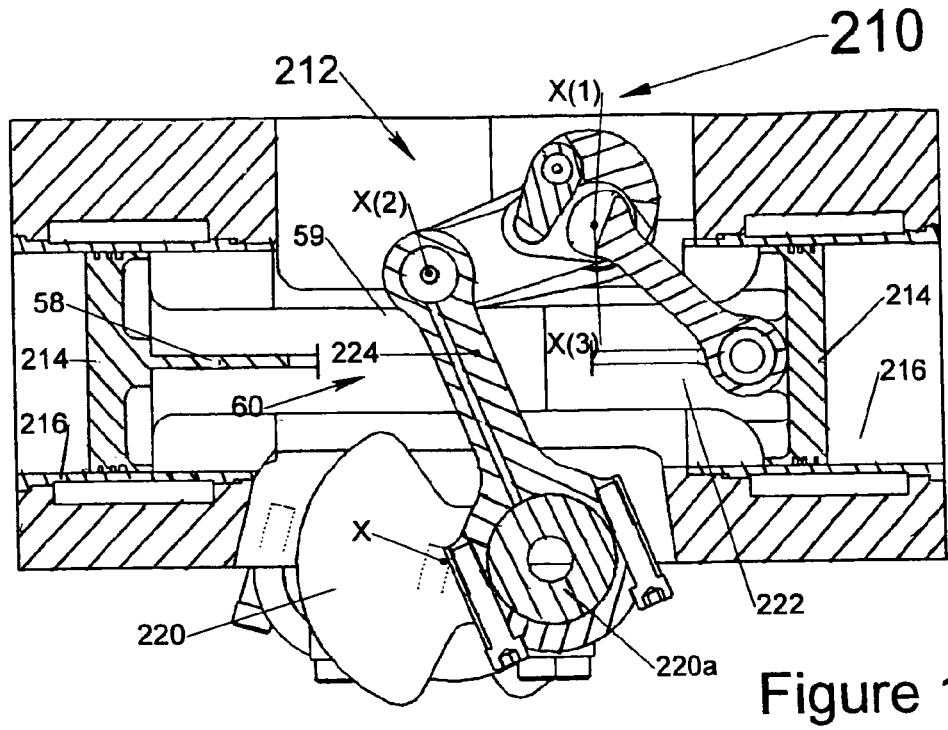
FIG. 11 is a cross section view through a piston/crank assembly of the multi-cylinder horizontally opposed piston de-activation engine FIG. 9 showing a double ended piston in the de-activated position.

FIG. 10 is a cross sectional view of the rocking mechanism 212 with the piston member 58 in the activated mode or condition, while FIG. 11 shows the rocking mechanism 212 with the piston member 58 in the de-activated mode. As will be appreciated, the integral form of piston member 58 results in each of its pistons 214 being held against reciprocation when mechanism 212 is in the de-activated mode. Also, of course, when mechanism 212 is in the activated mode, one of the pistons reaches its top dead centre position as the other piston reaches its bottom dead centre position.

Figure 12:
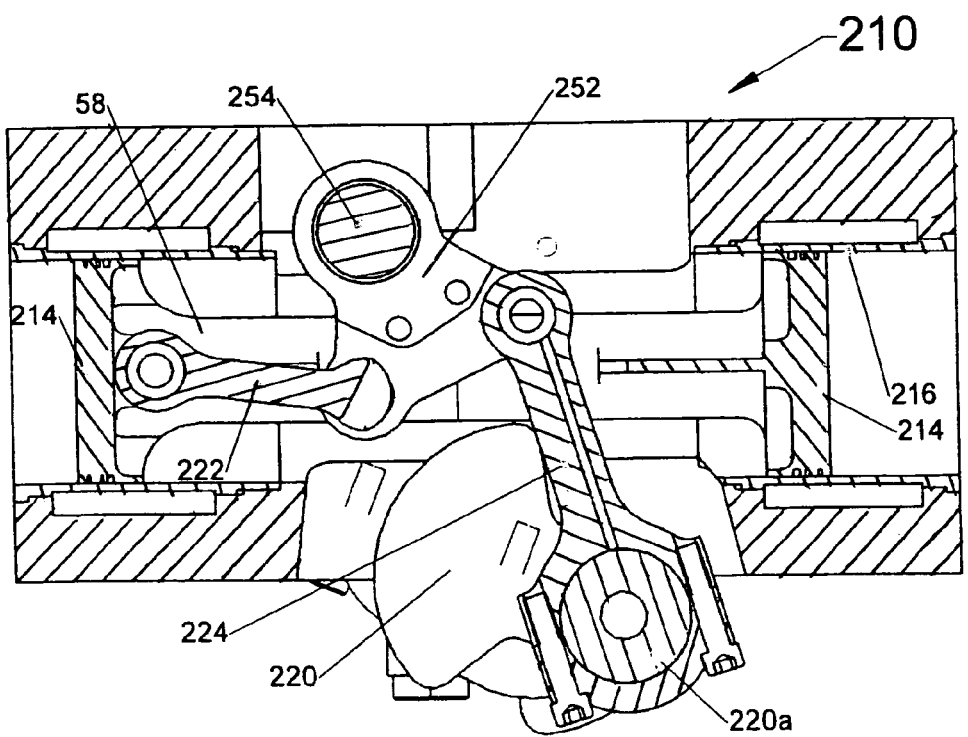
FIG. 12 is a cross section view through a piston/crank assembly of a multi-cylinder horizontally opposed piston de-activation engine showing the fixed oscillator section of a double ended piston required in the multi-cylinder engine of FIG. 9.

At least one double ended piston member 58 must remain active at all times to maintain rotational movement of crankshaft 220. For this, and to maintain the integrity of the engine structure, a double ended piston member 58 with a suitable fixed geometry oscillating mechanisms is required. Such a mechanism is shown in FIG. 12 and has an oscillating member 252 mounted and journalled on shafts 254. The engine 210 can be configured as a horizontally opposed four (4) or a horizontally opposed six (6) with the centre section with a fixed geometry mechanism; a horizontally opposed eight (8) preferably with the two centre sections as fixed geometry mechanisms.

Again, axes X and X(1) are to opposite sides of axis Y-Y on which piston 214 reciprocate.

Each of the engines described above, that is, engine 10 of FIGS. 1 to 5; engine 110 of FIGS. 6 to 8 and engine 210 of FIGS. 9 to 12, requires an activation system to activate and de-activate the pistons as required by an engine management system. An activation system according to one embodiment is described in FIGS. 13 to 15, while a second embodiment is described with reference to FIG. 16. Each activation system will be described in conjunction with engine 10 of FIGS. 1 to 4, (although it is to be understood that it will apply similarly with engines 110 and 210) and the same numerals of the components in engine 10 will be adopted.

Figure 13:
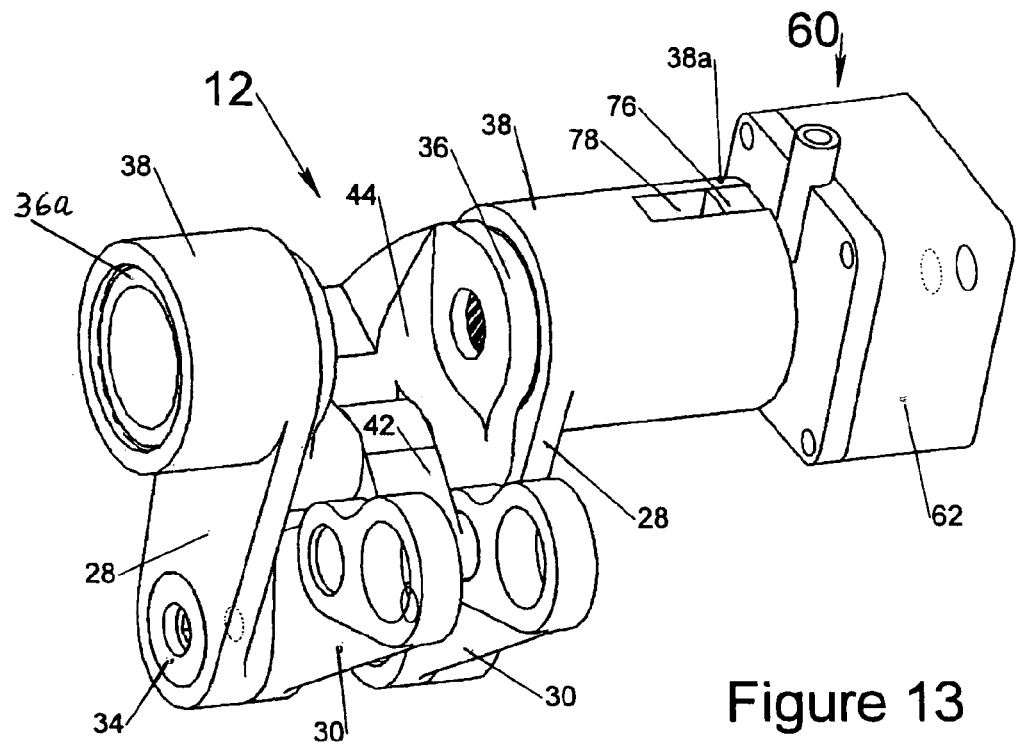
FIG. 13 is an isometric view of the oscillating elements in a piston de-activation engine with a linear to rotational hydraulic actuator system to activate and de-activate pistons in all of the engines corresponding to FIGS. 1,6 and 9.
Figure 14:
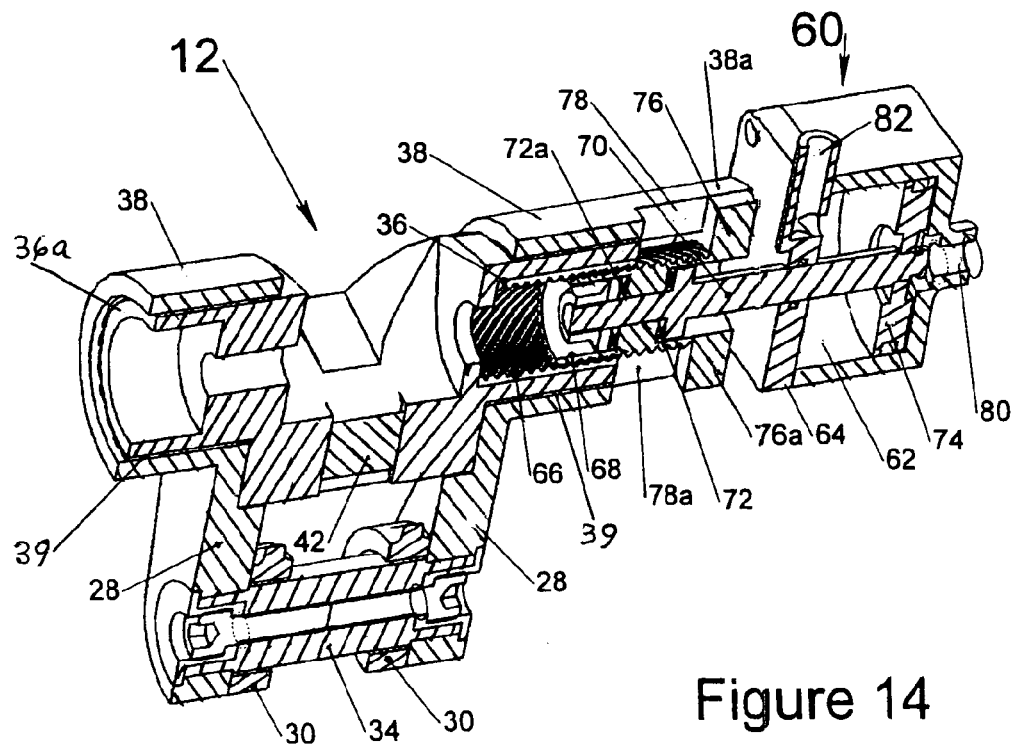
FIG. 14 is an isometric cross sectional view of the actuator system of FIG. 13 in the piston active position showing a helical spline to convert a linear motion of the hydraulic actuator to relative rotational motion between the oscillators and control shaft.

FIGS. 13 and 14 show a rocking mechanism 12 in a full stroke activated mode for a piston (not shown). This condition is achieved by the relative rotational movement between control shaft 36 and the two oscillating members 28 pivoting on common pin 34 such that link 42 is fully extended between control shaft 36 and the intermediate bores of links 30 and the angle between oscillating members 28 and links 30 pivoting on pin 34, is at a maximum.

The activation system 60 comprises of a double acting hydraulic cylinder 62 with a sealing plate 64 fixed to the engine crankcase 18 (not shown). A female helical spline 66 fixed in the internal bore of one end portion 36a of control shaft 36 mates with a corresponding male helical spline 68 rotatable on a shaft 70, via thrust bearings 72 and 72a. Shaft 70 connects spline 68 to hydraulic piston 74 within hydraulic cylinder 62. Additionally, the male helical spline 68 has two parallel lugs 76 and 76a extending radially and located in longitudinal slots 78 and 78a in an outer end 38a of the trunnion sleeve extension 38 of the oscillating member 28 nearer to the one end portion 36a. The lugs 76 and 76a are able to move linearly along slots 78 and 78a while the rocking mechanism 12 oscillates at a fast rate controlled by the engine speed and the throw of crankshaft 20 (not shown). Thrust bearings 72 and 72a prevent shaft 70 from oscillating.

An axial movement of the male helical spline 68 engaging with female helical spline 66 within control shaft 36, along slots 78 and 78a, causes control shaft 36 to rotate relative to trunnion sleeve extension 38 journalled on control shaft 36. This changes the angular relationship between oscillating member 28 and links 30. The axial movement of helical spline 68 is controlled by the linear movement of hydraulic piston 74 along the bore of hydraulic cylinder 62 between its two extremities. Shaft 70 connected to piston 74 communicates with the male helical spline 68 through a concentric bore in plate 64 and thrust bearings 72 and 72a.

The hydraulic cylinder 62 and plate 64 include ports 80 and 82 respectively through which they can receive oil under pressure, or alternatively, by which oil can be exhausted to an oil reservoir, via the control of a respective hydraulic valve (both not shown). To attain the position shown in FIG. 14, oil under pressure is applied and maintained to port 82 while port 80 is exhausted to the oil reservoir. The piston 74 is held against the outer wall of hydraulic cylinder 62 with the male and female splines 68 and 66 respectively engaged to hold the trunnion sleeve extension 38 and the control shaft 36 in their respective positions for the rocking mechanism 12 to be in the piston activation mode.

Figure 15:
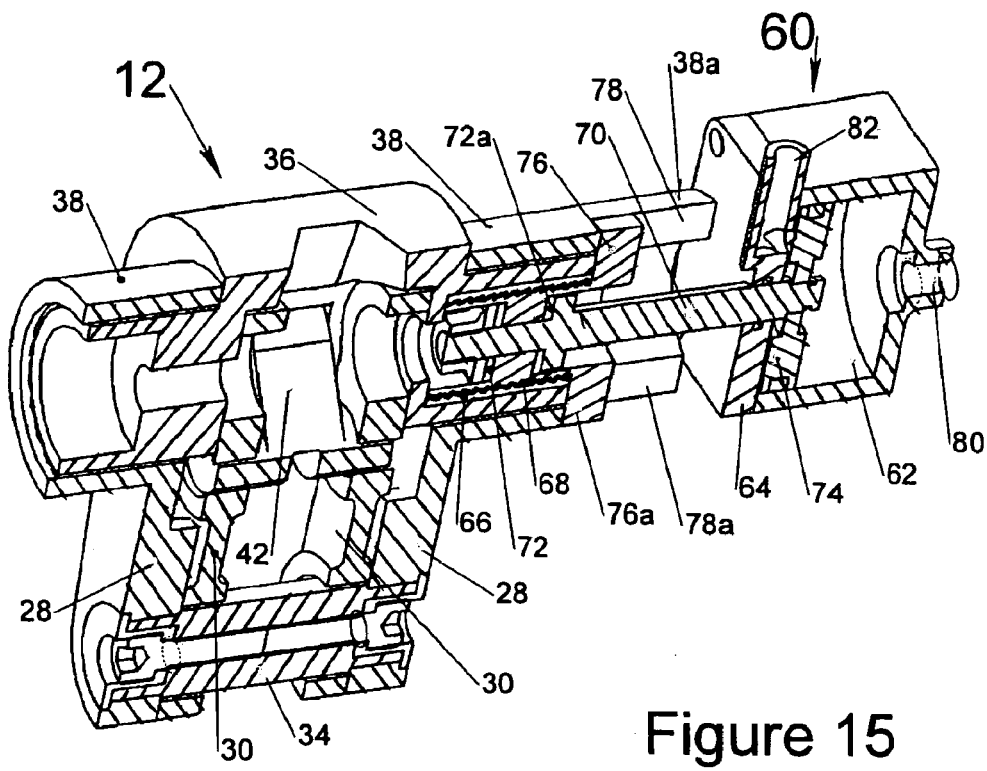
FIG. 15 is an isometric cross sectional view of the actuator system of FIG. 13 in the piston de-activated position.

To attain the position shown in FIG. 15, oil under pressure is applied and maintained to port 80 while port 82 is exhausted to the oil reservoir. Thus, the piston 74 is moved axially along the hydraulic cylinder 62 to the opposite end where it is held against plate 64. This movement causes an equivalent longitudinal motion of the male spline 68 connected axially to piston 74, and rotates the control shaft 36 relative to the trunnion sleeve extension 38, in this case clockwise, via the female helical spline 66. This movement causes the control shaft 36 to rotate and fold link 42 into cavity 44 of shaft 36, and thereby pull the upper end of links 30 into cavity 44 and align axes X(1) and X(3) and attain the piston de-activation mode for the rocking mechanism 12.

Figure 16:
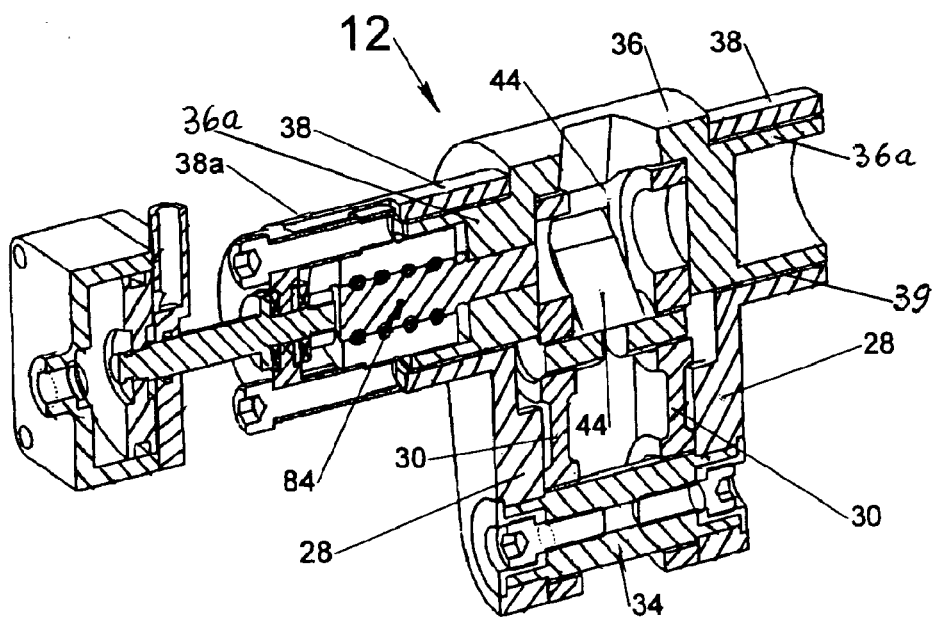
FIG. 16 is an isometric cross sectional view of an alternative actuator system showing a helical ball spline.

An alternative linear actuation arrangement is shown in FIG. 16. In this, the helical splines 66 and 68 shown in FIGS. 14 and 15 are replaced by a ball spline system 84. This ball spline system 84 with a large pitch angle allows a shorter axial movement for a large angular movement producing a faster response for the engine piston activation and de-activation modes.

It is to be understood that the hydraulic activation system 60 combined with the linear to rotational mechanism described in FIGS. 14 and 15, or FIG. 16, can be replaced by an electrical actuator, other mechanical arrangements or even an inbuilt hydraulic vane actuator.

It is understood that in all of the above embodiments, upon de-activation of any piston, fuel is cut off to the cylinder for that piston and re-supplied upon activation. In a four cylinder engine, for example, two cylinders may have a fixed stroke piston, with each of the others having a de-activateable piston. With the engine at idle speed or with vehicle under deceleration and/or braking condition, only the fixed stroke pistons need be active. For acceleration, each de-activatable piston can be activated in sequence to allow smooth introduction of power. During cruising conditions, only the number of pistons required, for running at optimum fuel efficiency, need to be active. Under these operating conditions considerable fuel savings are able to be achieved.

FIGS. 17 to 20 illustrate an engine 310 according to a fourth embodiment of the present invention which incorporates a rocking mechanism 312 according to the invention. Many components of the engine of FIGS. 17 to 20 are similar to those of engine 10 of FIGS. 1 to 3 and, where this is the case, the same reference numeral plus 300 is used.

Engine 310 incorporates a mechanism for varying the stroke of each piston in a multi-cylinder arrangement. The stroke of engine pistons can be adjusted at a very fast rate as demanded by the vehicle via sensors and an engine management system. In addition, the geometry of the link mechanism, and hence the relative spacing between pivot axes X(1), X(2), X(3) and axis X, can be adjusted or selected to allow for either a nearly constant compression ratio or a variable compression ratio between its two extremes. Furthermore, the engine can be operated to switch between its two extreme stroke positions, for a high compression ratio at its minimum stroke position and a low compression ratio at the maximum stroke position, allowing a turbocharger or supercharger to further enhance the power range of the engine.

Figure 17:
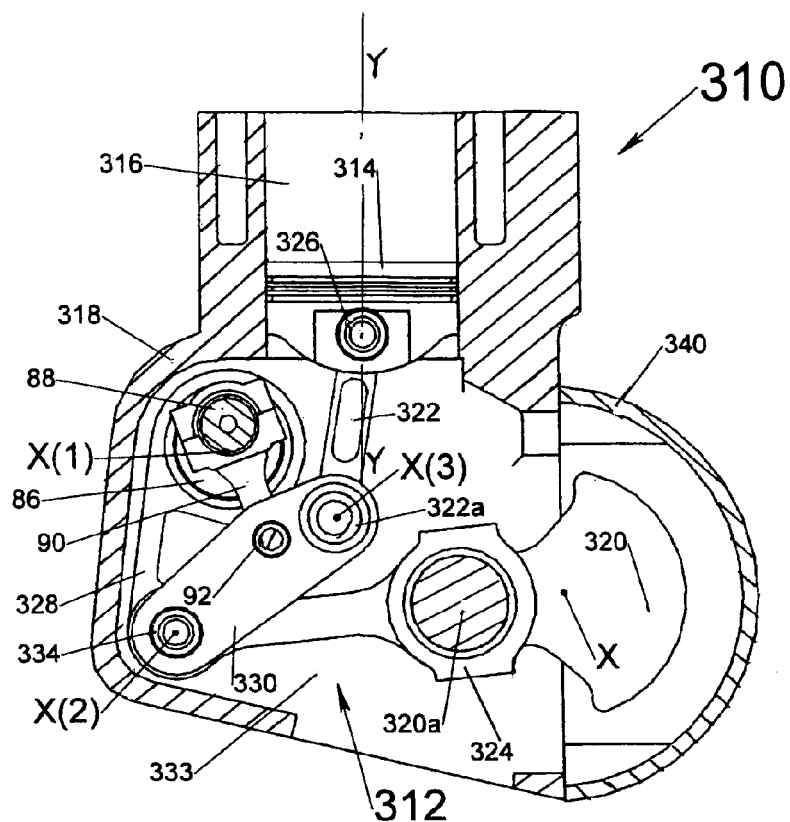
FIG. 17 is a transverse cross sectional view through a piston/crank assembly of a variable stroke engine according to a fifth embodiment of the present invention with the piston at the bottom-dead-centre position in the minimum stroke condition.
Figure 18:
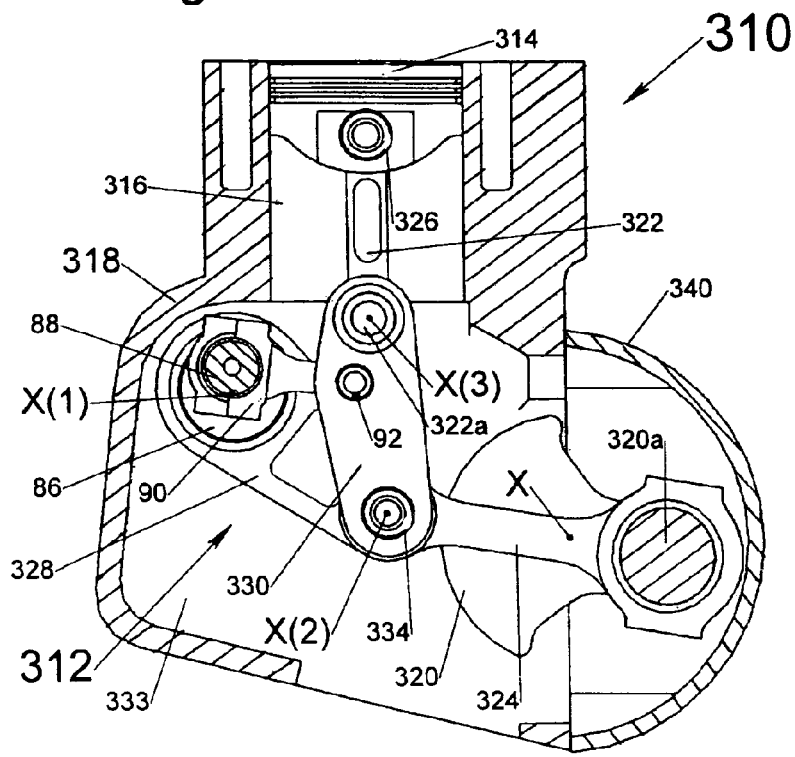
FIG. 18 shows the assembly of FIG. 17, but with the piston at the top-dead-centre position in the minimum stroke condition.

Referring to FIGS. 17 and 18, internal combustion engine 310 has a cylinder block 318 defining a plurality of cylinder bores 316, of which one is shown. As with engine 10 (and similarly with each of engines 110 and 210), the cylinders 316 are closed at one end by a cylinder head (not shown) which is provided with the usual inlet and exhaust ports, valves, actuating gear and ignition means, none of which are shown. Engine 310 has piston 314 drivingly coupled to crankshaft 320 by a rocking mechanism 312. Thus piston 314 moves in cylinder 316 along axis Y-Y and connects to a pair of parallel, laterally spaced, elongate oscillating members 328 via connecting rod 322 and pair of parallel, laterally spaced links 330. Connecting rod 322 is pivotally connected to the piston 314 via gudgeon pin 326, and pivotally connected to links 330 via pins 322a integral with con rod 322. The other end of links 330 are pivotally linked to the oscillating members 328 by a pin 334 fixed on either side of the oscillating members 328. The axes X(2) and X(3) of pins 334 and 322a and the axis of gudgeon pin 326 are parallel to each other and with axis X of crankshaft 320.

Oscillating members 328 are pivotally supported in a selected geometric position on an adjusting shaft 86 which is rotatable on axis X(1) parallel to axes X, X(2) and X(3) and which is spaced from axes X and X(2). Again, axis X(1) is positioned on the opposite side of the piston centreline, that is, of axis Y-Y, to that of axis X of crankshaft 320. Thus, shaft 86 extends parallel to the engine crankshaft 320 and each of pins 334, 322a and 326. Adjusting shaft 86 is rotatable on bearings (not shown) provided within the cylinder block in webs 333 separating the cylinders 316. Adjusting shaft 86 has an eccentric 88, while a connecting rod 90 extends between eccentric 88 and links 330. One end of rod 90 is rotatable on eccentric 88, while its other end is pivotally held between links 330 by a pin 92.

The oscillating members 328 connect to the crankshaft 320 via con rod 324. The little end of rod 324 is connected to member 328 by the common pin 334 at axis X(2), while its big end is journalled on crankpin 320a. Thus the linear motion of piston 314 is transferred to rotary motion of the crankshaft 330 via connecting rod 322, links 330, oscillating members 328 oscillating on adjusting shaft 86, and via connecting rod 324. The geometry of the linkage system as represented in FIG. 17 shows the engine 310 in the minimum displacement position with the piston 314 at bottom-dead-centre. The connection at pin 322a, between connecting rod 322 and links 330, is held in position by a holding device which includes the connecting rod 90 and also the eccentric 88 of shaft 86 to which rod 90 is pivotally connected; with eccentric 88 projecting from, and being eccentric with respect to, adjusting shaft 86.

The position of the eccentric pin 88 is controlled by the rotational position of adjusting shaft 86. The position of shaft 86 is in turn controlled by a directly connected hydraulic rotary actuator system (not shown)

Figure 19:
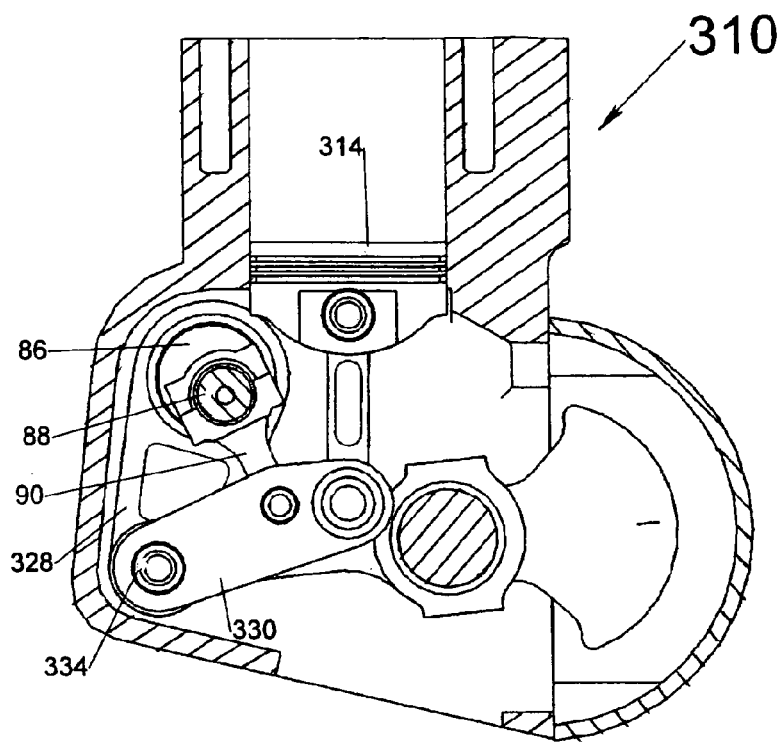
FIG. 19 shows the assembly of FIG. 17, but with the piston at the bottom-dead-centre position in the maximum stroke condition.
Figure 20:
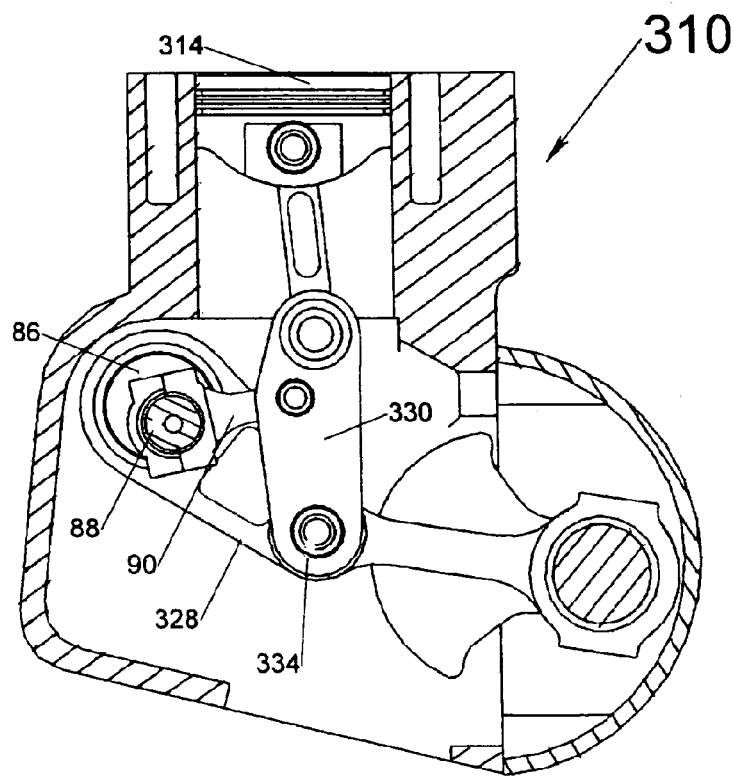
FIG. 20 shows the assembly of FIG. 17, but with the piston at the top-dead-centre position in the maximum stroke condition.

As indicated, FIG. 17 shows a minimum displacement for engine 310, with piston 314 at bottom-dead-centre. FIG. 18 shows piston 314 of engine 310 in the top-dead-centre position at minimum stroke, while the maximum stroke position is shown in FIG. 19. For the maximum stroke position a rotary actuator (not shown) is used to rotate shaft 86 to move its eccentric 88 to the position shown in FIG. 19. This rotational action moves links 330 via connecting rod 90 to have a greater angle relative to oscillating members 328 pivoting on common pin 334, effectively increasing the stroke of piston 314. FIG. 20 shows the engine 310 at maximum stroke and at the top-dead-centre position.

It is to be noted that at the minimum stroke position the top of piston 314 at top-dead-centre position moves higher up the cylinder 316 to compensate for the compression ratio. However, the respective geometries of pins 326, 322a, 334 and 92, eccentric 88 and the position of control shaft 86, can be selected to provide various piston adjustments and compression ratio variations, as desired by the engine designer.

Figure 21:
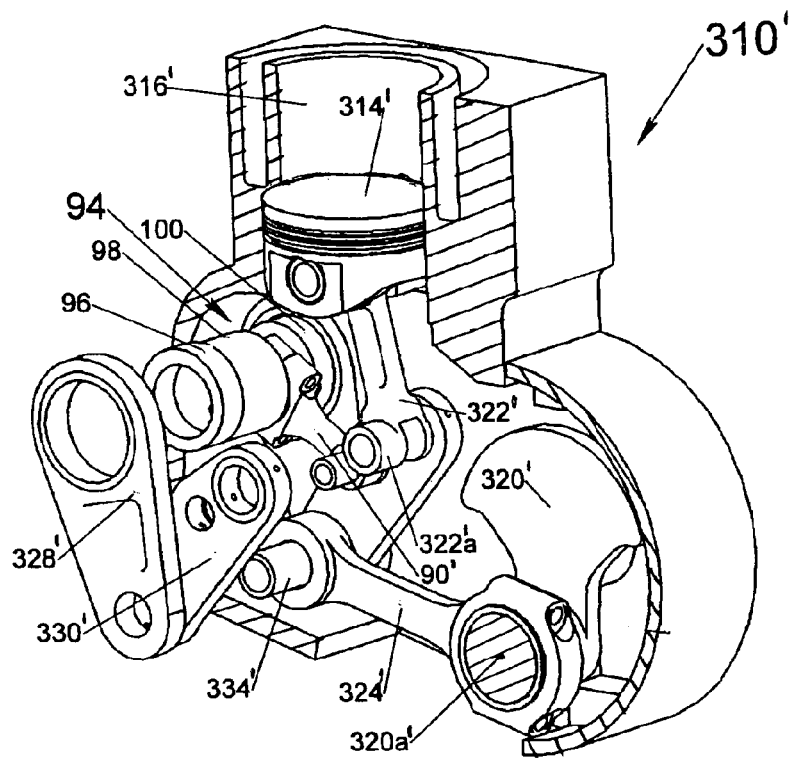
FIG. 21 is an isometric part cross sectional view showing one piston assembly of the multi-piston engine of a sixth embodiment of the invention.
Figure 21A:
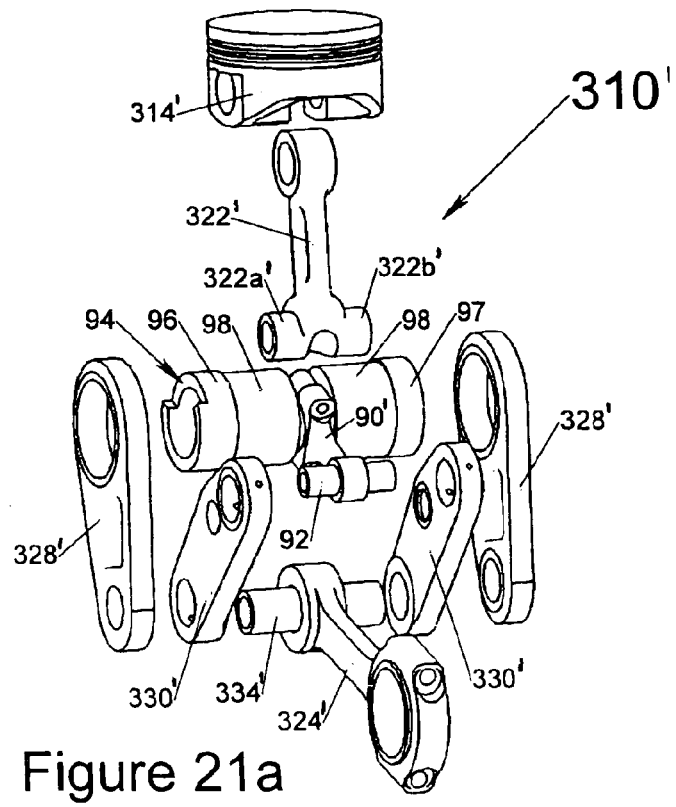
FIG. 21a is an exploded isometric view of components of the engine of FIG. 21.

FIG. 21 is a part sectioned and exploded isometric representation of engine 310', while FIG. 21a is an exploded isometric view of components of engine 310'. The engine 310' of FIGS. 21 and 21a is the same as engine 310 of FIGS. 17 to 20 except that shaft 86 of FIGS. 17 to 21 is replaced by shaft 94.

The variable displacement engine 310' can be adapted for operation under various conditions. In one arrangement the engine 310' can be adapted to operate as a two position capacity engine having two displacement positions only, minimum and maximum, with either the same compression ratio or different compression ratios to allow turbo or super-charging.

Figure 22:
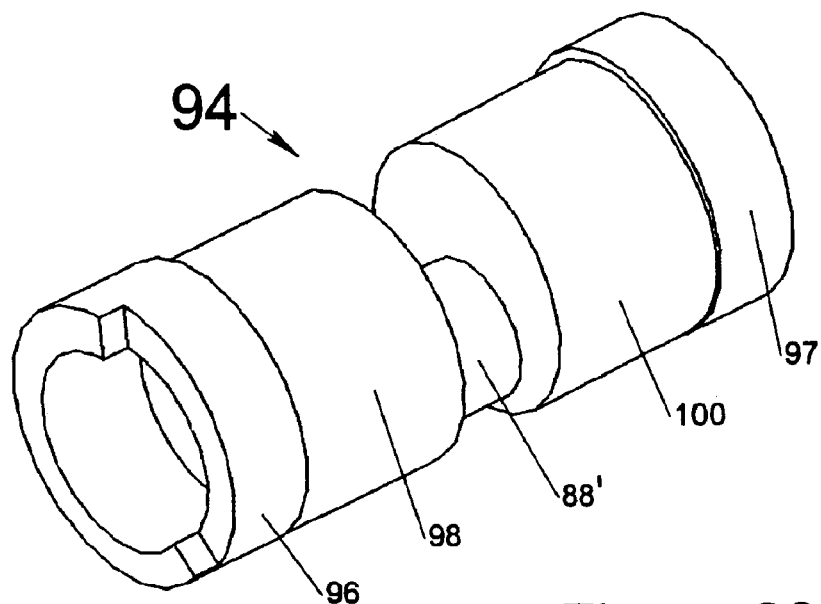
FIG. 22 is an isometric view of a component of the engine of FIG. 21.

To allow engine 310' to be adapted to operate as a variable capacity engine throughout its variable range an alternate adjusting shaft depicted in FIG. 22 needs to be adopted. Referring to FIGS. 21 and 22, an adjusting shaft 94 is rotatable via journals 96 and 97 on respective bearings (not shown). The bearings are within the engine block webs (not shown) which separate the cylinders 316' and crankshaft 320' on conventional main bearings (not shown). Adjusting shaft 94 has eccentric 88' rotatably connected to one end of connecting rod 90' while the other end of rod 90' is connected to links 330' via pin 322a' such that eccentric 88 is positioned in a selected geometric position parallel to the engine crankshaft 320'.

Rocking members 328' are rotatably supported on mutually concentric eccentrics 98 and 100 of adjusting shaft 94. Eccentrics 98 and 100 allow for the compression ratio to be kept within acceptable limits and the stroke is small relative to the stroke adjusting eccentric 88'. The rotational centre of eccentrics 98 and 100 relative to eccentric 88' is generally positioned opposite to the centerline bisecting the rotational angle of the adjusting shaft 94 between minimum and maximum stroke positions. However, the position of the eccentrics 98 and 100 relative to eccentric 88 can be varied to suit a particular characteristic determined by the engine designer.

While the description in relation to FIGS. 17 to 20 is of the one piston 314, and mechanism 312 shown, it is to be understood that the same description applies to each piston of the in-line configuration. However, the adjusting shaft 86 is common to each mechanism 312, and has a respective eccentric 88 by which the stroke of each piston is simultaneously varied by rotation of adjusting shaft 86. Thus each eccentric on adjusting shaft 86 is in the same axis relative to the axis X(1) of adjusting shaft 86. The above applies to the alternate adjusting shaft 94 of FIG. 22.

With engine 310 of FIGS. 17 to 20 and engine 310' of FIGS. 21 to 22 the variable stroke engines 310 and 310' can be operated in an Atkinson Cycle engine mode. In the Atkinson Cycle mode the induction and compression strokes are short but with the power and exhaust strokes long. This allows the combustion to expand over a longer distance and thus extract more work from a fuel charge, leading to improved fuel consumption. Further improvements in fuel economy can be achieved due to it allowing the compression ratio to be varied during operation, and thus also allowing turbochargers and supercharges to be used for optimum performance and economy.

Referring to FIG. 17, for example, the Atkinson cycle is achieved by rotating shaft 86 and thus eccentric 88 at half the rotational speed of crankshaft 320. The rotation of shaft 86 is preferably, but not necessarily, in the same direction of crankshaft 320. For this, shaft 86 is drivingly connected by drive means (not shown), such as by gears or chain drive, to crankshaft 320 with a fixed ratio of one to two respectively. Shaft 86 continues to have the same function of supporting oscillating members 328. The rotational position of eccentric 88 relative to the crankshaft 320 position is pre-determined to achieve the desired geometric relationship for an Atkinson Cycle.

It is to be noted that throughout the variations of stroke of the piston 314 of engine 310, the action of the eccentric 88 via connecting rod 90, is to allow the pair of links 330 pivoting on pin 334, to expand and contract, relative to the rotational position of shaft 86. For a multi-cylinder in-line variable stroke engine, each eccentric 88 on shaft 86 follows the same angular spaced of the crankpin 320a on crankshaft 320. The same applies in engine 310'.

By introducing variable timing between the shaft 86 and crankshaft 320 of engine 310 (in a similar manner to a variable valve timing mechanism in conventional engines) the characteristics of the Atkinson Cycle can be altered as desired, as well as having the ability to alter the compression ratio, further improving the efficiency of the engine. However, in order to have a more flexible compression ratio adjustment, shaft 86 can be replaced by the alternate shaft 94 as shown in FIG. 22 to have the same function in engine 310' as that described for engine 310.

It is to be noted that the embodiment of FIGS. 21 to 22 differs from other embodiments described herein. This is due to oscillating members 328' being journalled on eccentrics 98 and 100 of shaft 94. As a consequence, the axis X(1) on which members 328' oscillate is not co-incident with the longitudinal axis on which shaft 94 is rotatable. Thus, axis X(1) and that longitudinal axis are parallel, but spaced from each other. The axis X(1) therefore is not fixed during rotation of shaft 94 on its longitudinal axis. Rather, axis X(1) is drawn arcuately around the longitudinal axis of shaft 94.

Figure 23:
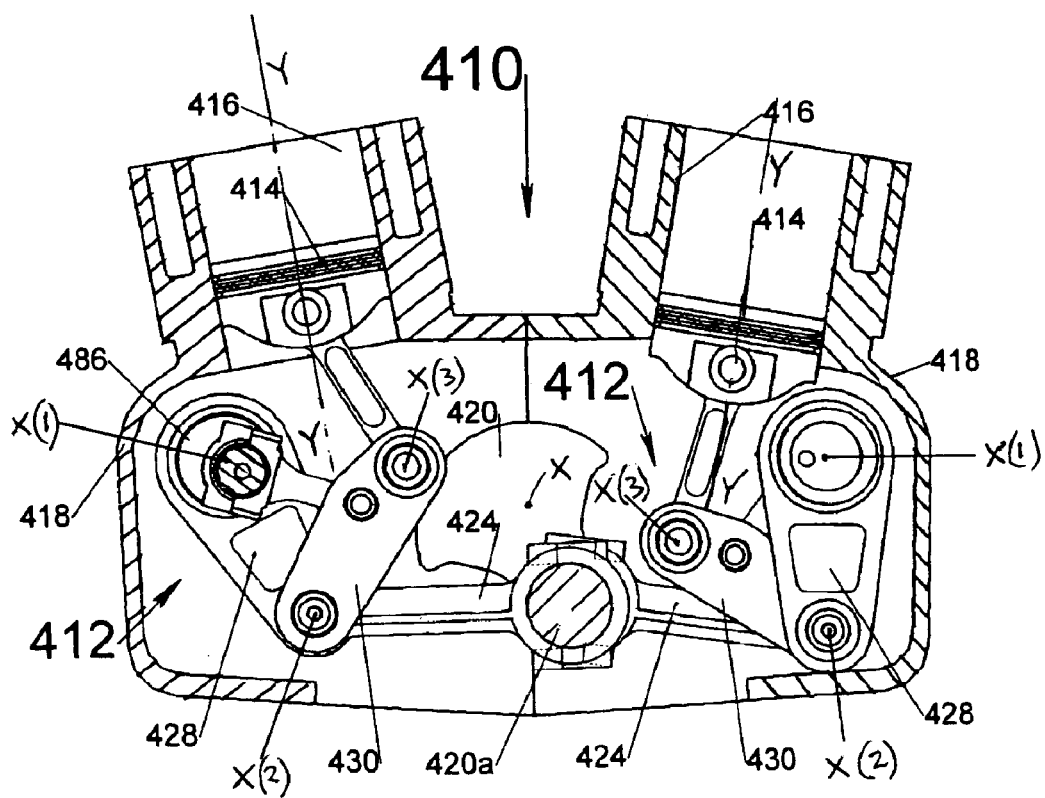
FIG. 23 is a part cross sectional view of variable stroke V-type engine according to a seventh embodiment having mirror imaged elements of FIG. 17.

FIGS. 23 and 24 illustrate an engine 410 according to a sixth embodiment of the present invention that incorporates a pair of rocking mechanisms 412 configured in a V-type cylinder arrangement and as a variable stroke engine. Many components of the engine in FIGS. 23 and 24 are similar to those in FIGS. 1 to 5 (and also FIGS. 17 to 20 and FIG. 21), where this is the case, the same reference numerals as in FIGS. 1 to 5 plus 400 are used. Also, as functioning of engine 410 generally will be understood from the description in relation to FIGS. 17 to 21, the description of engine 410 will be limited to principal features by which it differs from engine 310.

The V-type cylinder arrangement of engine 410 comprise of two rocking mechanisms 412 mounted in crankcases 418 in a mirror image and laterally spaced by an amount to allow the two con rods 424 to be mounted on the same crankpin 420*a* of a common crankshaft 420. The angle of the V can be varied from zero (parallel) to 90 degrees. However, it is more appropriate to limit the angle to approximately 30 degrees. An isometric view of engine 410 is shown in FIG. 24. The engine 410 can be configured as a multiple piston variable stroke in a V-formation. In order to have a more flexible compression ratio adjustment, shafts 486 can be replaced by the alternate shaft 94 as shown in FIG. 22 to have the same function as that described for engine 310.

As in previous embodiments, the axis Y-Y on which each piston 414 moves is intermediate of the X and X(1) axes for the arrangement for that piston 414.

The variable stroke V-type engine 410 of FIGS. 23 and 24 can be converted into a V-type Atkinson Cycle engine to form a seventh embodiment of the present invention. The benefits of an Atkinson Cycle engine have been stated above and the implementation of the rocking mechanisms also described above into a V-type engine with a central crankshaft produces a compact arrangement.

In FIGS. 23 and 24 the V-type Atkinson cycle is achieved by rotating shafts 486 and thus eccentric 488 at half the rotational speed of crankshaft 420 preferably, but not necessarily, in the same direction of crankshaft 420. For this, shafts 486 are drivingly connected by drive means (not shown), such as by gears or chain drive, to crankshaft 420 with a fixed ratio of one to two respectively.

Further improvements in fuel economy can be achieved due to it allowing the compression ratio to be varied independently during operation, and thus also allowing turbochargers and supercharges to be used for optimum performance and economy. This is achieved by introducing variable timing between the shafts 486 and crankshaft 420 (in a similar manner to a variable valve timing mechanism in conventional engines) the characteristics of the Atkinson Cycle can be altered as desired, as well as having the ability to alter the compression ratio, further improving the efficiency of the engine. However, in order to have a more flexible compression ratio adjustment, shafts 486 can be replaced by the alternate shaft 94 as shown in FIG. 22 to have the same function as that described for engine 310.

FIGS. 25 and 26 illustrate an engine 510 according to an eighth embodiment of the present invention. Many components of the engine in FIGS. 25 and 26 are similar to those in FIGS. 1 to 5, where this is the case, the same reference numerals as in FIGS. 1 to 5 plus 500 are used. Also, as functioning of engine 510 generally will be understood from the description in relation to FIGS. 1 to 5, the description of engine 510 will be limited to principal features by which it differs from engine 10.

Engine 510 incorporates a rocking member 552 pivoting on adjusting shaft 554. More specifically, the rocking member 552 pivoting on adjusting shaft 554, provides means by which piston 514 can have an adjustable compression ratio (CR) as required to improve the operating condition of the engine. However, each of a plurality of pistons 514 of engine 510, either in an in-line, V, or parallel configuration, can be similarly provided with a respective member 552 each pivotable on a respective shaft 554 or on a common shaft 554.

The CR may be varied while the engine is in motion, even in motion at a fast rate, as demanded by a vehicle in which the engine 510 is provided, via sensors (not shown) and an engine management system (also not shown).

With reference to FIGS. 25 and 26, engine 510 includes a cylinder block represented by the one cylinder 516 shown which houses the one piston 514 shown. Extending from the cylinder block, engine 510 further includes a crankcase 518 which houses rocking member 552 and, spaced to one side of the line of cylinders, a crankshaft 520 having an axis X. The piston 514 is drivingly connected to the crankshaft 520 by a first con rod 522, rocking member 552 and a second con rod 524. One end of the first con rod 522 is pivotably connected to the piston 514 by a gudgeon pin 526 and, at its other end, to rocking member 552 via integral pin 528 having an axis X(3). The second con rod 24 has a little end connected to rocking member 552 via pin 534 having an axis X(2) and its big end journalled on crankpin 532 of crankshaft 520.

Rocking member 552 is pivotally supported in a selected geometric position on the eccentric 536 of adjusting shaft 534 having an axis X(1) which extends parallel to the engine crankshaft 520 and each of pins 526, 528, and 534. In FIGS. 25 the adjusting shaft 554 is rotated such that the eccentric 536 is at its uppermost position, and thus provides the engine with the maximum compression ratio. Adjusting shaft 554 is rotatable on bearings (not shown) provided within the cylinder block in webs separating the cylinders 516. Adjusting shaft 554 and thus eccentric 536 is rotated by a suitable actuator relative to the engine crankcase 518, generally within 180° of shaft rotation. The actuator (not shown) may be of the hydraulic, mechanical or electrical type.

While the adjusting shaft 554 rotated by within 180° and dependent on the stroke of eccentric 536, as shown in FIG. 26, the eccentric 536 then is at its selected lowermost position having the effect of lowering the piston 514 at its top deadcentre position. The increased cylinder volume at top dead centre, represented by cylinder distance 'b' increases the total head volume and thus lowers the compression ratio.

As indicated member 552 is mounted on shaft 554 for rocking movement on axis X(1) and so as to be adjustable by rotation of shaft 534 for varying the top-dead-centre position of piston 514 and hence the compression ratio obtained in cylinder 516.

In a further embodiment within engine 510, The adjusting shaft 534 may be constantly rotated at half engine speed by a suitable gear or chain drive (not shown) from crankshaft 520, preferably in the same direction as crankshaft 520 with the addition of a phasing mechanism (not shown but similar to a variable valve timing mechanism in conventional engines), The phasing mechanism has the effect of changing the compression ratio of engine 510 with the additional benefit of generating an Atkinson Cycle effect similar but smaller than that produced by engine 410 of FIGS. 23 and 24 of the seventh embodiment. The extent of the Atkinson Cycle effect is governed by the eccentricity of eccentric 536.

Allowing the compression ratio to be varied improves fuel economy and also allows turbochargers and supercharges to be used for optimum performance and economy.

The scope of the invention need not be limited to the mechanism shown, variations in the positioning of the crankshaft, the rocking member and linkage geometries to achieve the same outcome, fall within this invention.

The invention claimed is:

1. An internal combustion engine having a cylinder block, a cylinder head and a crankcase, a plurality of inline cylinders defined by the cylinder block, a crankshaft journalled in the crankcase for rotation on a longitudinal axis of rotation, a respective piston in each cylinder, and a respective first con rod on one end of which each piston is mounted and on the remote end of which each piston is connected, via a respective rocking mechanism and a respective second con rod, to the crankshaft for transferring linear reciprocation movement of each piston in its cylinder to, and for rotating, the crankshaft, wherein the rocking mechanism for at least one selected cylinder includes:

an oscillating device;

a mounting device by which the oscillating device is mounted on a structure of, or secured to, a crankcase of the engine for reversible oscillating movement of the oscillating device on a first axis parallel to the crankshaft axis;

wherein the oscillating device is pivotally connected to each of:

(i) the little end of the second con rod, with a big end of the second con rod connected to the crankshaft for relative rotation, between the rocking mechanism and the second con rod, on a second axis spaced from and parallel to the first axis, and (ii) the remote end of the first con rod on which the piston is mounted for relative rotation, between the rocking mechanism and said remote end, on a third axis spaced from and parallel to each of the first and second axes;

wherein the first and third axes are substantially equidistant from the second axis and the oscillating device is pivotally connected to the respective con rods so that the first axis and the crankshaft axis are positioned to opposite sides of an axis on which the piston is reversibly reciprocable;

wherein the mounting device includes a shaft by which the oscillating device is mounted on the structure, or secured to, the crankcase, whereby the stroke of the piston is adjustable for a mode of operation comprising one of:

(a) piston reciprocation adjustment to enable operation with either a zero stroke or a maximum stroke to enable piston de-activation and re-activation;

(b) piston reciprocation adjustment to enable operation with either a maximum or a minimum stroke setting;

(c) piston reciprocation adjustment to enable operation with a selected stroke between a maximum and minimum stroke setting;

(d) piston reciprocation adjustment to enable operation with piston reciprocation in an Atkinson Cycle effect, with or without an independent variable compression ratio; and (e) piston reciprocation adjustment to enable operation—with piston reciprocation to provide a variable compression ratio with a moderate Atkinson Cycle effect, and, wherein the oscillating device includes an oscillating member by which the oscillating device is mountable on said structure of, or secured to, the crankcase, and wherein the oscillating device further includes a link member and a holding and adjusting device; the link member at one of opposite ends thereof is pivotally connected to the oscillating member so as to be pivotable relative to the oscillating member on a fourth axis co-incident with or adjacent to the second axis between two extreme positions and at the other end is adapted for pivotally connecting on the third axis to the remote end of the con rod on which the piston is mounted, and the holding device is operable to releasably hold the link member at either of two extreme positions and to adjust the link member by causing movement of the link member between the two extreme positions.

2. The engine of claim 1, wherein the oscillating device includes a laterally spaced pair of link members each pivotally connected at one end thereof to the oscillating member and each adapted at the other end thereof for pivotally connecting on the third axis to the remote end of the con rod on which the piston is mounted.

3. The engine of claim 1, wherein the shaft of the mounting device has a longitudinal axis parallel to but spaced from the first axis, the shaft having an eccentric providing a crank journal on which the oscillating device is mounted for reversible oscillating movement on the first axis; and wherein the shaft is mounted on the structure to receive drive by which it is reversibly rotatable on the longitudinal axis for moving the first axis circumferentially around the longitudinal axis between two extreme positions whereby the top dead centre position for the piston is able to be varied between a respective limit corresponding to each of the angular extremes for adjusting the compression ratio for the cylinder in which the piston is moveable.

4. The engine of claim 1, wherein the shaft of the mounting device has a longitudinal axis parallel to but spaced from the first axis, the shaft having an eccentric providing a crank journal on which the oscillating device is mounted for reversible oscillating movement on the first axis; and wherein the shaft is adapted to receive drive by which it is rotatable on the longitudinal axis at half the rotational speed of the crankshaft for causing the first axis to orbit around the longitudinal axis for moving the piston in an Atkinson cycle mode.

5. The engine of claim 1, wherein the shaft of the mounting device has a longitudinal axis co-incident with the first axis, the shaft forms part of the holding and adjusting device, the holding and adjusting device further includes a connecting link which extends laterally from the shaft and is pivotal by connected at one of opposite ends thereof to the link member at a location intermediate of the ends of the link member, the other end of the connecting link is pivotally connected to the shaft at a location spaced from the first axis, and wherein the shaft is adapted to receive drive for reversibly rotating the shaft on the longitudinal axis and thereby draw the pivot connection between the connecting link and the shaft arcuately around the first axis and move the third axis towards or away from the first axis by pivoting of the link member on the fourth axis.

6. The engine of claim 5, wherein the holding and adjusting device is operable, by reversible rotation of the shaft, to pivot the link member between two extreme positions in one of which the third axis is at a maximum spacing from the first axis and enables a maximum stroke for the piston and in the other extreme position for the shaft the third axis is co-incident with the first axis for attaining a de-activated condition for the piston in which its stroke is zero.

7. The engine of claim 1, wherein the oscillating member is a rigid unitary oscillating member to which the little end of the further con rod and the one end of the link member is pivotally connected for pivoting relative to the oscillating member on the second and fourth axis, respectively.

8. The engine of claim 1, wherein the oscillating member has a pair of rigid, laterally spaced portions to each of which the little end of the further con rod and the one end of the link member is pivotally connected for pivoting relative to the oscillating member on the second and fourth axis, respectively.

9. The engine of claim 8, wherein the shaft of the mounting device has its longitudinal axis co-incident with the first axis, with each of the offset portions of the oscillating member is journalled on the shaft, the shaft forms part of the holding and adjusting device and the holding and adjusting device further includes a connecting link which extends laterally from the shaft; wherein the connecting link at one of opposite ends thereof is pivotally connected to each of the link members at a location intermediate the ends of each link member, with the other end of the connecting link pivotally connected to the shaft at a location which is intermediate of the laterally spaced portions of the oscillating member and spaced from the first axis; and wherein the shaft is adapted to receive drive for reversibly rotating the shaft on the longitudinal axis and thereby reversibly drawing the pivot connection between the connecting link and the shaft arcuately around the first axis and thereby move the third axis towards or away from the first axis by pivoting of the link members on the fourth axis.

10. The engine of claim 9, wherein the holding and adjusting device is operable, by reversible rotation of the shaft, to pivot the link members between two extreme positions in one of which the third axis is at maximum spacing from the first axis and enables a maximum stroke for the piston and in the other extreme position in which the third axis is co-incident with the first axis for attaining a de-activated condition for the piston in which the piston has zero stroke.

11. The engine of claim 9, wherein each of the laterally spaced portions of the oscillating member defines a respective sleeve by which the laterally spaced portion is journalled on the shaft, with the sleeve of each laterally spaced portion extending axially away from the other laterally spaced portion.

12. The engine of claim 9, wherein the shaft defines a laterally open recess adjacent to the location at which the connecting link is pivotally connected to the shaft, the recess having a width axially of the shaft and a depth enabling edge portions of the link members to be received therein when the third axis is co-incident with the first axis.

13. The engine of claim 2, wherein the shaft of the mounting device has its longitudinal axis parallel to but laterally offset from the first axis, the shaft defines a first eccentric having an axis coincident with the first axis and further defines a second eccentric having an eccentric axis parallel to the longitudinal axis but laterally spaced from the longitudinal and first axes; wherein the shaft forms a part of the holding and adjusting device further including a connecting link which extends laterally from the shaft, the connecting link at one of opposite ends thereof is pivotally connected to the link member at a location intermediate the ends of the link member, with the other end of the connecting link journalled on the second eccentric of the shaft; and wherein the shaft is adapted to receive drive for rotating the shaft on the longitudinal axis for causing the first and eccentric axes to orbit around the longitudinal axis for moving the piston in an Atkinson cycle mode.

14. The engine of claim 9, wherein the shaft of the mounting device has its longitudinal axis parallel to but laterally spaced from the first axis, the shaft defines two axially spaced eccentrics each having an axis co-incident with the first axis and a further eccentric located between the axially spaced eccentrics and having an eccentric axis parallel to the longitudinal axis but laterally spaced from the longitudinal and first axes;
   each oscillating member is journalled on a respective one of the spaced eccentrics;
   wherein the shaft forms a part of the holding and adjusting device further including a connecting link which extends laterally from the shaft, the connecting link at one of opposite ends thereof is pivotally connected to each link member at a location intermediate the ends of the link members, with the other end of the connecting link journalled on the further eccentric of the shaft; and wherein the shaft is adapted to receive drive for rotating the shaft on the longitudinal axis for causing the eccentric axes to orbit around the longitudinal axis for moving the piston in an Atkinson cycle mode.

15. The engine of claim 1, wherein the plurality of inline cylinders and their pistons are in a first bank, and the engine includes a second bank of cylinders and pistons substantially identical to the first bank;
   at least one selected cylinder of the second bank has a rocking mechanism which is substantially identical to that for the select cylinder of the first bank; and where, for the select cylinder of the second bank the first and third axes are substantially equidistant from the second axis and the oscillating device is pivotally connected to the respective con rods so that the first axis and the crankshaft axis are positioned on opposite sides of an axis on which the piston is reversibly reciprocable.

16. The engine of claim 15, wherein the first and second banks of cylinders are in a V-configuration.

17. The engine of claim 15, wherein the first and second banks of cylinders are in a boxer configuration.

18. The engine of claim 1, wherein the rocking mechanism of each cylinder other than a select cylinder comprises an oscillating member which is rotationally mounted on a structure of, or secured to, the crankcase for reversible oscillating movement on the first axis, and which is pivotally connected on the third and second axis, respectively, to the remote end of the first con rod and the little end of the second con rod, such that each piston of a cylinder other than a selected cylinder remains active to maintain rotational movement of the crankshaft.

* * * * *